(12) United States Patent
Venton-Walters et al.

(10) Patent No.: US 9,631,563 B2
(45) Date of Patent: *Apr. 25, 2017

(54) TORQUE PULSE DAMPENER

(75) Inventors: Roy Venton-Walters, Neshkoro, WI (US); Michael P. Bujold, Royal Oak, MI (US)

(73) Assignee: Orbital Traction, Ltd, Austin, TX (US)

( * ) Notice: Subject to any disclaimer, the term of this patent is extended or adjusted under 35 U.S.C. 154(b) by 666 days.

This patent is subject to a terminal disclaimer.

(21) Appl. No.: 13/168,993

(22) Filed: Jun. 26, 2011

(65) Prior Publication Data

US 2012/0000446 A1 Jan. 5, 2012

Related U.S. Application Data

(60) Provisional application No. 61/359,860, filed on Jun. 30, 2010.

(51) Int. Cl.
| | |
|---|---|
| F02D 41/00 | (2006.01) |
| F02B 33/36 | (2006.01) |
| F02B 39/02 | (2006.01) |
| F16D 1/10 | (2006.01) |
| F16H 15/20 | (2006.01) |
| F16H 55/36 | (2006.01) |
| F02B 39/12 | (2006.01) |
| F16H 15/50 | (2006.01) |

(52) U.S. Cl.
CPC .......... *F02D 41/0002* (2013.01); *F02B 33/36* (2013.01); *F02B 39/02* (2013.01); *F16D 1/101* (2013.01); *F16H 15/503* (2013.01); *F16H 55/36* (2013.01); *F02B 39/12* (2013.01); *F16H 2055/366* (2013.01); *Y10T 477/55* (2015.01); *Y10T 477/68* (2015.01)

(58) Field of Classification Search
CPC ............ F16H 55/36; F16H 55/52; F16H 55/56
USPC ........ 123/559.1, 241, 197.1; 474/12, 94, 13, 474/14
See application file for complete search history.

(56) References Cited

U.S. PATENT DOCUMENTS

| | | | |
|---|---|---|---|
| 2,209,497 | A | 7/1940 | Winger et al. |
| 2,913,932 | A | 11/1959 | Oehrli |
| 3,452,622 | A | 7/1969 | Kashihara |
| 3,504,574 | A | 4/1970 | Okabe |
| 3,516,305 | A | 6/1970 | Chery |
| 3,670,595 | A | 6/1972 | Chery |
| 3,707,888 | A | 1/1973 | Schottler |
| 3,793,907 | A | 2/1974 | Nakamura et al. |
| 3,793,910 | A | 2/1974 | Nasvytis |
| 4,158,317 | A | 6/1979 | James |

(Continued)

FOREIGN PATENT DOCUMENTS

| | | |
|---|---|---|
| DE | 560276 | 9/1932 |
| GB | 2119041 | 11/1983 |

(Continued)

*Primary Examiner* — Thomas Denion
*Assistant Examiner* — Jessica Kebea
(74) *Attorney, Agent, or Firm* — Egan Peterman Enders Huston

(57) ABSTRACT

A torsional pulse dampener including a pulley rotationally coupled to a piston that is axially displaceable and adapted to give torsional compliance from an engine for at least one-half revolution of an angular differential displacement between the pulley and the piston.

33 Claims, 19 Drawing Sheets

(56) References Cited

U.S. PATENT DOCUMENTS

| | | | |
|---|---|---|---|
| 4,345,486 A | 8/1982 | Olesen | |
| 4,424,726 A | 1/1984 | Galbraith | |
| 4,463,620 A | 8/1984 | Horton | |
| 4,527,534 A | 7/1985 | Sakurai et al. | |
| 4,589,396 A | 5/1986 | Tokushima et al. | |
| 4,823,758 A | 4/1989 | Tamura et al. | |
| 4,856,374 A | 8/1989 | Kreuzer | |
| 4,913,684 A * | 4/1990 | Mantovaara et al. | 474/12 |
| 4,968,290 A | 11/1990 | Kashihara et al. | |
| 5,117,799 A * | 6/1992 | Suzuki et al. | 123/561 |
| 5,129,869 A | 7/1992 | Sagata et al. | |
| 5,154,155 A | 10/1992 | Ohnaka et al. | |
| 5,427,079 A | 6/1995 | Andrepont, Jr. et al. | |
| 5,549,095 A * | 8/1996 | Goto et al. | 123/559.1 |
| 5,651,750 A | 7/1997 | Imanishi et al. | |
| 5,810,141 A | 9/1998 | Organek et al. | |
| 5,846,152 A * | 12/1998 | Taniguchi et al. | 475/210 |
| 6,066,068 A | 5/2000 | Takemura et al. | |
| 6,406,399 B1 | 6/2002 | Ai | |
| 6,461,268 B1 | 10/2002 | Milner | |
| 6,802,779 B2 * | 10/2004 | Tabuchi et al. | 464/32 |
| 7,004,860 B2 * | 2/2006 | Yoshida et al. | 474/20 |
| 7,086,981 B2 | 8/2006 | Ali et al. | |
| 7,125,359 B2 | 10/2006 | Milner | |
| 7,207,910 B2 * | 4/2007 | Dell et al. | 474/74 |
| 7,396,311 B2 | 7/2008 | Ali et al. | |
| 7,431,677 B2 | 10/2008 | Miller et al. | |
| 7,608,006 B2 | 10/2009 | Milner | |
| 7,681,559 B2 * | 3/2010 | Pratley et al. | 123/559.1 |
| 7,931,552 B2 * | 4/2011 | Pendergrass et al. | 474/74 |
| 7,980,973 B1 * | 7/2011 | Starkey et al. | 474/18 |
| 8,047,920 B2 * | 11/2011 | Jansen et al. | 464/60 |
| 8,070,632 B2 * | 12/2011 | Yuan | 474/94 |
| 8,177,669 B2 * | 5/2012 | Ishida et al. | 474/94 |
| 8,272,982 B2 * | 9/2012 | Fitz | 474/94 |
| 8,276,549 B2 * | 10/2012 | Wu et al. | 123/1 A |
| 8,292,766 B2 * | 10/2012 | Cali et al. | 474/171 |
| 8,313,405 B2 | 11/2012 | Bazyn et al. | |
| 8,469,000 B2 * | 6/2013 | Ouwenga et al. | 123/337 |
| 8,529,387 B2 * | 9/2013 | Lannutti et al. | 474/74 |
| 8,602,928 B2 * | 12/2013 | Serkh et al. | 474/70 |
| 8,639,423 B2 | 1/2014 | Schaaf et al. | |
| 8,740,743 B2 | 6/2014 | Kliewer | |
| 2002/0013653 A1 * | 1/2002 | Ohyama et al. | 701/103 |
| 2002/0027053 A1 * | 3/2002 | Back et al. | 192/3.3 |
| 2004/0092359 A1 | 5/2004 | Imanishi et al. | |
| 2004/0112698 A1 * | 6/2004 | Maienschein | 192/3.23 |
| 2004/0235596 A1 * | 11/2004 | Otaki et al. | 474/8 |
| 2004/0248678 A1 * | 12/2004 | Kapaan et al. | 474/8 |
| 2005/0113202 A1 | 5/2005 | Miller et al. | |
| 2005/0181905 A1 * | 8/2005 | Ali et al. | 475/210 |
| 2006/0032225 A1 | 2/2006 | Dyne et al. | |
| 2006/0144046 A1 | 7/2006 | Vetrovee | |
| 2006/0154775 A1 | 7/2006 | Ali et al. | |
| 2007/0197321 A1 * | 8/2007 | Ishioka et al. | 474/28 |
| 2007/0254756 A1 * | 11/2007 | Kawamoto et al. | 474/70 |
| 2007/0270267 A1 | 11/2007 | Miller et al. | |
| 2008/0093189 A1 * | 4/2008 | Wiesneth et al. | 192/45.1 |
| 2008/0149452 A1 * | 6/2008 | Pratley et al. | 192/30 V |
| 2008/0200298 A1 | 8/2008 | Suzuki | |
| 2008/0200300 A1 | 8/2008 | Smithson et al. | |
| 2008/0300098 A1 | 12/2008 | Serkh et al. | |
| 2009/0098968 A1 | 4/2009 | Maguire et al. | |
| 2009/0197719 A1 * | 8/2009 | Ali et al. | 474/94 |
| 2010/0009796 A1 * | 1/2010 | Fitz | 474/197 |
| 2010/0147646 A1 * | 6/2010 | Lannutti et al. | 192/41 S |
| 2010/0184543 A1 * | 7/2010 | Yamashita et al. | 474/11 |
| 2010/0199666 A1 | 8/2010 | VanDyne et al. | |
| 2010/0300415 A1 | 12/2010 | Bell et al. | |
| 2010/0304907 A1 * | 12/2010 | Yuan | 474/161 |
| 2012/0025542 A1 | 2/2012 | Schaaf et al. | |
| 2012/0088616 A1 * | 4/2012 | Ali et al. | 474/94 |
| 2013/0123065 A1 | 5/2013 | Bujold | |
| 2013/0267361 A1 * | 10/2013 | Cali et al. | 474/70 |
| 2013/0345004 A1 * | 12/2013 | McCrary | 474/148 |

FOREIGN PATENT DOCUMENTS

| | | |
|---|---|---|
| GB | 2130314 | 5/1984 |
| GB | 2339863 | 2/2000 |
| GB | 2342130 | 4/2000 |
| GB | 2354293 | 3/2001 |
| GB | 2379250 | 3/2003 |
| GB | 2381839 | 5/2003 |
| GB | 2394519 | 4/2004 |
| GB | 2408081 | 5/2005 |
| JP | 01/110874 A1 | 4/1989 |
| JP | 06137398 | 5/1994 |
| WO | 8302986 | 9/1983 |
| WO | 9935417 | 7/1999 |
| WO | 02088573 | 11/2002 |
| WO | 03023256 | 3/2003 |
| WO | 2005090827 | 9/2005 |
| WO | 2010017324 A1 | 2/2010 |
| WO | WO 2010085483 A2 * | 7/2010 |

* cited by examiner

TORQUE PULSE DAMPENER

PRIORITY CLAIM

This application claims priority to U.S. Provisional Application No. 61/359,860 entitled "Power Plant, Torque Pulse Dampener, and Method of Using a Bypass Valve" filed Jun. 30, 2010.

BACKGROUND

1. Technical Field

The invention relates to torque pulse dampeners.

2. Description of Related Art

Vehicles consume significant amounts of fossil fuels. Due to limited resources and environmental pressures, vehicle manufacturers are attempting to reduce fuel consumption of the vehicles they manufacture while still providing sufficient power. Superchargers and turbochargers can be used to increase the power of an internal combustion engine. A particular system can include a combination of a supercharger, a turbocharger and turbo-compounding, using a hydraulic or mechanical continuously variable transmission to drive the turbocharger up to a specific speed or intake manifold pressure and then holding the speed to keep it at a desired boost pressure for the engine condition. Such a system relies on the supercharger to initially increase the boost pressure before the turbocharger can achieve sufficient boost pressure.

The application of Continuously Variable Transmissions (CVTs) to vehicular applications may also be used to improve fuel efficiencies by maintaining a variable but preferred drive ratio between an internal combustion engine and the driven load. In vehicular applications CVT drives may be used in the transmission drive line between the engine and the vehicle's wheels or in the drive line between the engine and various accessories. However applied, a CVT may be controlled by signals from a control module incorporating a software program that takes real-time output values from a number of sensors measuring various related parameters. The computed CVT control signals would then effect CVT ratio change by means of a servo actuator physically driving the input to the CVT's ratio-shift system.

Rolling traction CVTs rely on the "frictional" contact between rolling elements to transmit torque through their spinning input/output shafts. The force that effectively loads the contact surfaces between rolling elements within the CVT is often referred to as the normal force. The normal force allows the CVT to transmit tractive force (the torque being transmitted by the CVT). In rolling traction and similar CVTs, typically lubricated and cooled by traction fluid, the normal force is typically several times greater than the tractive force. The exact relationship between the normal and tractive forces varies with the specific design, operating conditions, temperature and type of traction fluid used. If the ratio of normal force to tractive force is too low, then slip may occur and damage to the CVT's precision tractive surfaces may result. If the ratio of normal force to tractive force is too high, then the CVT's efficiency may be compromised and the CVT's service life will be disproportionally reduced.

The ratio of normal to tractive forces may vary significantly in practice due to a variety of torque variations. For example, the torque pulsations caused by the firing impulses of an internal combustion engine create cyclic angular accelerations on the rotating crankshaft. While the output from an internal combustion engine is usually specified in terms of mean torque, the pulse peaks may be several times the mean torque value. These variations can create temporary conditions where the ratio of normal to torque forces in a connected CVT may be too low or high, creating the issues described above.

Other types of torque variation conditions often occur during the operation of an engine. For example, in the case of an engine incorporating a supercharger driven from the engine's crankshaft, a sudden demand by the driver for a high power output for brisk acceleration would generate a sudden increase in torque as the supercharger is engaged. Due to these types of torque variations, parts in the driveline are often sturdily designed to handle these types of variations in addition, a variety of types of damping mechanisms have been developed to help manage these variations.

These torque variations have implications to the use of CVTs or other types of transmissions or accessories such as superchargers and turbochargers with internal combustion or reciprocating engines in general.

SUMMARY

A torsional pulse dampener including a pulley rotationally coupled to a piston that is axially displaceable and adapted to give torsional compliance from an engine for at least one-half revolution of an angular differential displacement between the pulley and the piston.

BRIEF DESCRIPTION OF THE SEVERAL VIEWS OF THE DRAWINGS

Skilled artisans appreciate that elements in the figures are illustrated for simplicity and clarity and have not necessarily been drawn to scale. For example, the dimensions of some of the elements in the figures may be exaggerated or minimized relative to other elements to help to improve understanding of embodiments of the invention. Embodiments incorporating teachings of the present disclosure are illustrated and described with respect to the drawings presented herein.

The novel features believed characteristic of the invention are set forth in the appended claims. The invention itself, further objectives and advantages thereof, as well as a preferred mode of use, will best be understood by reference to the following detailed description of illustrative embodiments when read in conjunction with the accompanying drawings, wherein:

The use of the same reference symbols in different drawings indicates similar or identical items.

DETAILED DESCRIPTION

Figure 1:
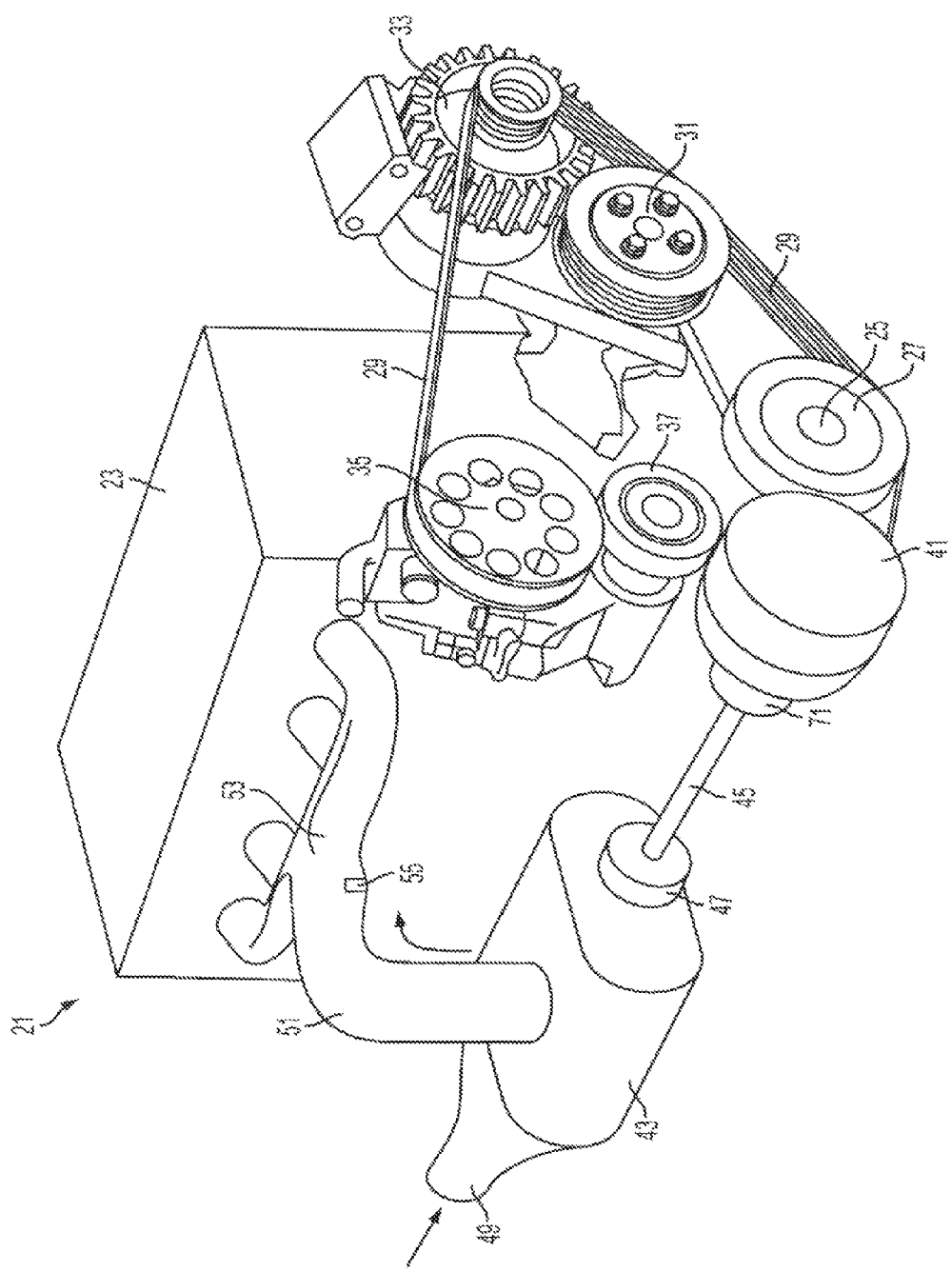
FIG. 1 is a schematic view of embodiments of a power plant and system having a CVT for modulation of power output.

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application. The teachings can also be utilized in other applications and with several different types of systems and associated components.

Devices that are in operative communication with one another need not be in continuous communication with each other unless expressly specified otherwise. In addition, devices or programs that are in communication with one another may communicate directly or indirectly through one or more intermediaries.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by anyone of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single device is described herein, more than one device may be used in place of a single device. Similarly, where more than one device is described herein, a single device may be substituted for that one device.

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the present invention, suitable methods and materials are described below. In addition, the materials, methods, and examples are illustrative only and not intended to be limiting.

Embodiments of power plants, torque pulse dampeners, and methods of using bypass valves are disclosed. This detailed description begins with a brief overview and a more detailed discussion follows.

In a set of embodiments, a power plant can include an internal combustion (IC) engine having a crankshaft, a pump coupled to the IC engine, and a continuously variable transmission (CVT) coupled to the crankshaft and the pump. The CVT has a control ratio operable to control a pressure of a compressible fluid provided from the pump to the IC engine, wherein the control of the pressure extends in a range from a vacuum pressure to another pressure higher than atmospheric pressure.

In another set of embodiments, a power plant can include an engine, a continuously variable transmission (CVT), and a torque pulse dampener (TPD) coupled to the engine and to the CVT.

In a further set of embodiments, a torsional pulse dampener can include a pulley rotationally coupled to a piston that is axially displaceable and adapted to give torsional compliance from an engine for at least one-half revolution of an angular differential displacement between the pulley and the piston.

In yet a further set of embodiments, a method of controlling a valve of a pump comprises operating an engine having an engine intake coupled to a pump output of a pump, and a continuously variable transmission (CVT) coupled to the engine and to the pump; and operating a valve between a pump input of the pump and the engine intake, such that the valve can be opened during a ratio change of the CVT.

The foregoing and other objects and advantages of the embodiments will be apparent to those skilled in the art, in view of the following detailed description, taken in conjunction with the appended claims and the accompanying drawings.

A power plant can include an engine and a continuously variable transmission (CVT) coupled directly or indirectly to the engine. The CVT can be any of several types, many of which will be described later in this specification. In a particular embodiment, the CVT is a rolling traction CVT, and more particularly, a Milner-type CVT. The CVT can include planetary members in rotting contact with axially movable inner and outer races. In an embodiment, the engine is an internal combustion (IC) engine having a crankshaft. The crankshaft can be coupled directly or indirectly to the CVT, which in turn can be coupled to a pump, accessory, or the like.

In a particular embodiment, the pump can be a positive displacement combined pump and motor (PDCPM) and can compress a compressible fluid, such as a gas. In a particular embodiment, the pump is a supercharger. The gas can include air, O2 (for example, at a concentration other than air), H2, a methane-containing or ethane containing gas (for example, natural gas), N2O, CO, another suitable gas used by an IC engine, or any combination thereof. The CVT has a control ratio that can control the pressure of the gas or other compressible fluid provided from the pump to the engine over a range from a vacuum pressure to another pressure higher than atmospheric pressure.

In some embodiments, the pump has a pump output that is coupled to an engine intake of the engine. An intake manifold can be coupled to the pump output and the engine intake. A valve can be implemented along the flow path between the pump and the engine. In another embodiment, each cylinder may have its own separate intake, rather than the intake manifold.

In another particular embodiment, the accessory can include an alternator or a pump, such as a water pump, a power steering pump, an air conditioning compressor, or the like. In another embodiment, the power plant can include a torque pulse dampener (TPD) that can be coupled to the engine and the CVT.

Skilled artisans will appreciate that many engines use a liquid fuel source and use air as an oxygen source. To simplify understanding of the concepts described herein, a particular power plant having an IC engine wherein the pressure of air supplied to the IC engine is controlled is described. After reading this specification, skilled artisans will appreciate that other compressible fluids may be used in place of or in conjunction with air. To the extent oxidizing gases and fuel-based gases have different concerns, such concerns will be addressed with respect to particular components, for example, the bypass valve.

Figure 2:
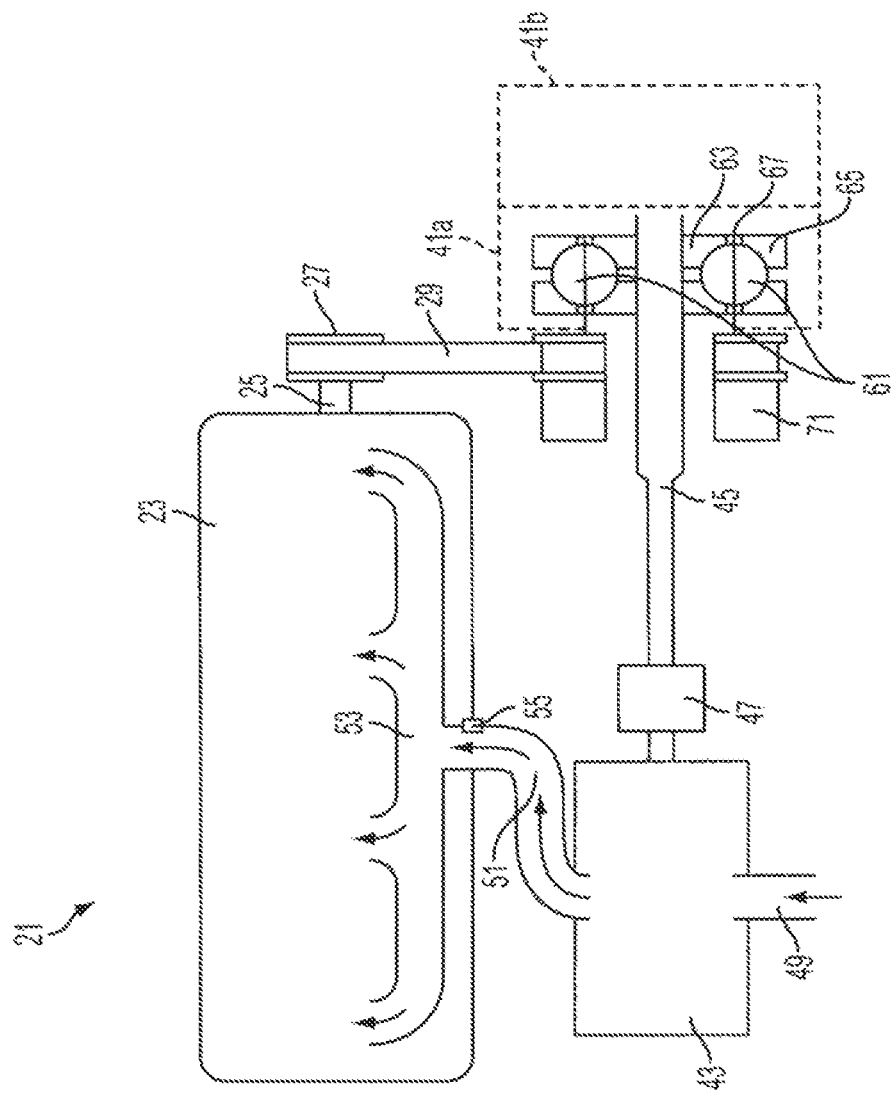
FIG. 2 is a schematic plan view of other embodiments of a power plant.
Figure 3:
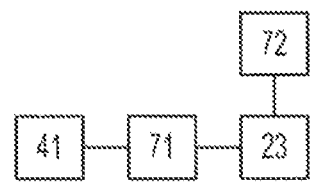
FIG. 3 is a schematic diagram of an embodiment of a powertrain system for FIGS. 1 and 2.

Referring to FIGS. 1 and 2, for example, a power plant 21 may comprise an engine 23, a continuously variable transmission (CVT) 41 and a torque pulse dampener (TPD) 71 coupled to the engine 23 and the CVT 41. The TPD 71 dampens torque pulses between the engine and the CVT. Embodiments may further comprise an accessory 43 (e.g., a pump, an alternator, etc.) coupled to the engine 23, with the CVT coupled to the engine and the accessory, and the CVT having a control ratio operable to control an input from the engine to the accessory. As shown in FIG. 3, the engine 23 may form a portion of a powertrain system including a transmission 72 coupled thereto and adapted to change gears to distribute power to a wheel of a vehicle having the power plant. The transmission may have a plurality of fixed ratios.

An embodiment of power plant 21 includes an IC engine 23 having a crankshaft 25 (FIGS. 1 and 2). A pump 43 is coupled to the IC engine 23. The CVT 41 is coupled to the crankshaft 25 and the pump 43. The CVT 41 has a control ratio operable to control a pressure of a gas or fluid provided from the pump 43 to the IC engine 23. The control of the pressure extends in a range from a vacuum pressure to another pressure higher than atmospheric pressure.

Other embodiments of the power plant 21 comprise an IC engine 23 having crankshaft 25, a crankshaft pulley 27 mounted to the crankshaft 25 for driving at least one accessory belt 29. Belt 29 may be used to drive various accessories, such as an air conditioning compressor 31, an alternator 33, a water pump 35, etc., and may be routed through an idler 37.

Belt 29 also is coupled to a continuously variable transmission (CVT) 41, either directly or indirectly. The CVT 41 is positioned between and coupled to the crankshaft 25 and pump 43. In some cases, pump 43 may be a positive displacement combined pump and motor (PDCPM), such as a supercharger. For the purposes of this specification, a turbocharger is not a type of supercharger. The CVT 41 has an output shaft 45 that drives the pump 43 through an optional coupling 47, such as a compliant coupling. The pump 43 has an engine intake 49 and a pump output 51 that feeds processed air into an intake manifold 53 that is coupled to IC engine 23.

The outlet 51 may further comprise a bypass connection 55 as part of the intake system between the intake manifold 53 and atmosphere. The bypass connection 55 may be located along a flow path between the engine intake and atmosphere, the embodiments of FIGS. 4 and 5, the bypass connection 55 may be selectively opened, closed or modulated with a valve 58. The valve 58 may be located along the flow path at a point between the engine intake 49 and the pump output 51, wherein the valve 58 is operable to open, close or modulate the bypass connection 55. The valve 58 also may be located in or between the pump output 51 and the intake manifold 53 that provides air for cylinders of the IC engine 23. In particular embodiments, the valve 58 can be a pressure relief valve or waste gate valve, a fast acting butterfly valve, etc.

Figure 6:
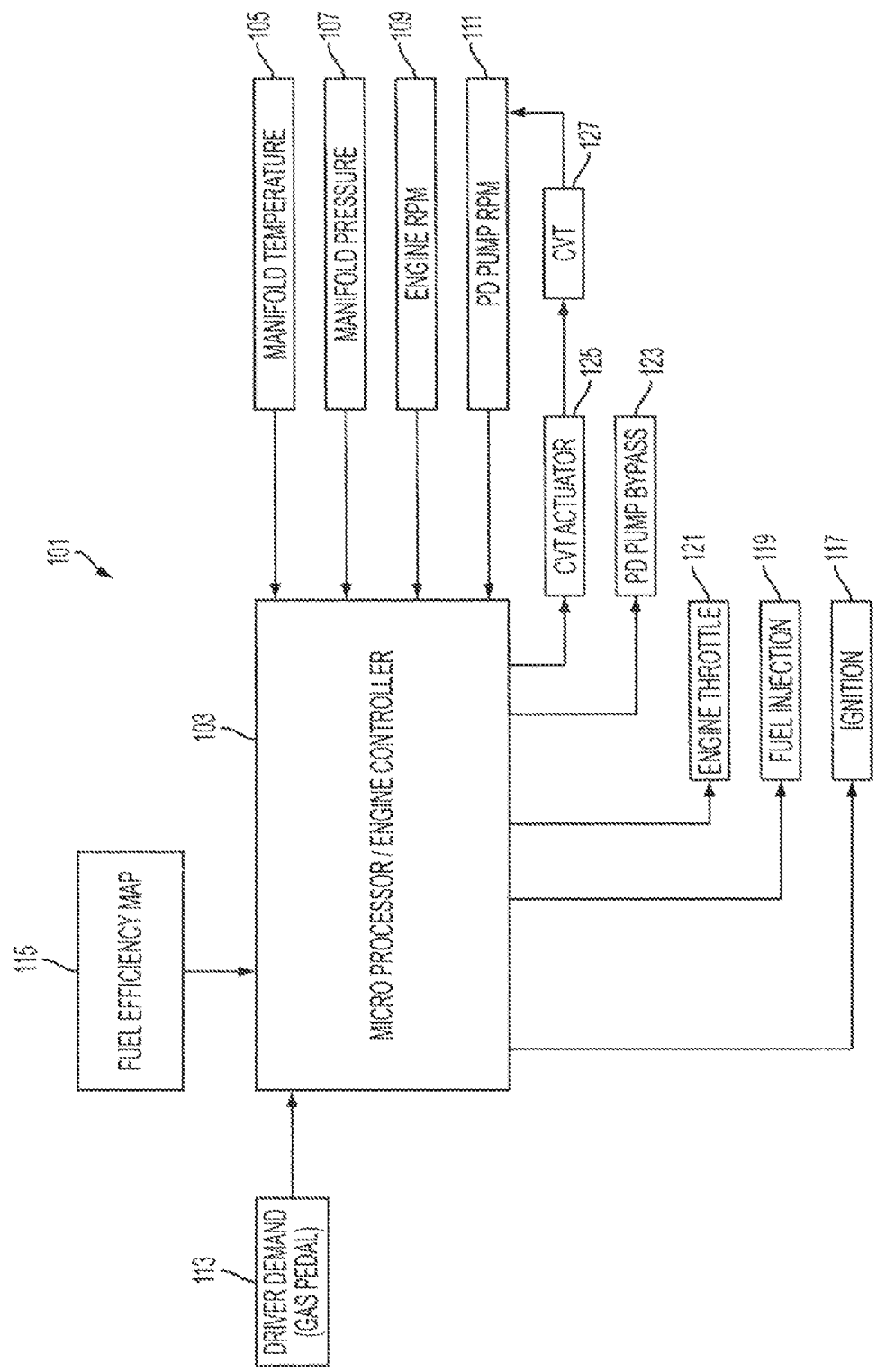
FIG. 6 is a high level flow diagram of an embodiment of a control system for the power plant.

The system may further comprise an engine throttle 56, an air mass flow sensor 60 and an exhaust gas sensor 62. These embodiments also may comprise sensors 64, such as a temperature sensor, a pressure sensor or any combination thereof. The sensors 64 may be use in an operational control system, such as the control system 101 depicted in FIG. 6 which will be described later herein.

In some embodiments, the pump 43 comprises a supercharger having the valve 58. The valve 58 is normally used to release excess pressure so as to not exceed the maximum pressure rating of the system components. When the CVT 41 is used to operate the supercharger, it is desirable to shift the system as quickly as possible to attain maximum boost within a short time window. For example, in some embodiments the operations used for this rapid shift time are:

Opening the valve 58 to release the boost pressure that would otherwise be fed to the engine 23;

Shifting the CVT 41 to a desired control ratio (either increasing the control ratio or decreasing the control ratio) as fast as desired, under low load conditions, such that a smaller shift force is exerted on the CVT system; and Closing the valve 58 to regain or rebuild boost pressure in the pump 43 so that engine boost is reestablished.

Because shifting is performed under relatively low loading conditions, a small shift motor 44 may be used to control the CVT 41.

Alternatively, this system and method for rapid shifting may comprise a pulsed operation of the valve 58. The pulsed operation of valve 58 allows the pressure to be released in a controlled method to achieve the rapid shift (again, low to high, high to low, or any control ratios between low and high) without completely releasing all of the engine boost pressure. This embodiment provides better engine performance as the complete boost is not released, and the CVT 41 shifts at a nominal shift force level while still attaining the desired rapid shift time.

In yet a further set of embodiments, a method of controlling a valve of a pump operating with an engine and CVT can have the engine intake coupled to a pump output, with the CVT coupled to the engine and to the pump. In some examples, the force used to change the ratio of the CVT is a function of the torque imposed on the CVT, such that lowering the torque also towers the ratio change force. In some embodiments, a valve between the pump output and pump input is opened and closed to vary the differential pressure across the pump resulting in lowering or increasing the torque used to drive the pump. This control method permits greater ratio control speed or a reduction in control force for the CVT.

The method also may comprise operating a valve between a pump input of the pump and the engine intake, such that the valve can be opened during a ratio change of the CVT. Otherwise the valve is closed in part or in whole. Operating the valve may comprise increasing a pressure at a point along a flow path between the pump output and the engine intake; opening the valve to decrease the pressure at the point along the flow path between the pump output and the engine intake during the ratio change to change a shift torque exerted on the CVT; and closing the valve after the ratio change.

Other embodiments increasing a pressure at a point along a flow path between the pump output and the engine intake; opening a valve to decrease the pressure at the point along the flow path between the pump output and the engine intake; changing the CVT to a different control ratio such that a tower shift force is exerted on the CVT; and closing the valve after changing the CVT to the different control ratio. Closing the valve regains pressure in the pump so that an engine boost pressure and load on the CVT are reestablished. Changing the CVT to a different control ratio occurs temporarily under lower loading conditions such that the lower shift force is exerted on the CVT. The CVT changes control ratios within a range of about 0.1 to 0.5 seconds, or about 0.3 seconds in some embodiments. The valve has a response time of about 0.05 to 0.1 seconds, or about 0.08 seconds in some embodiments.

Opening the valve may include pulsing an operation of the valve to allow the pressure to be released therethrough in a controlled method without completely releasing all of the pressure. A solenoid valve may be used to control pneumatic vacuum to the bypass valve of the pump. A signal from an engine controller may be used to modulate an air volume to the bypass valve and thereby control a position of the valve.

In some embodiments, the control ratio of the CVT 41 is changed within a fraction of a second, and the valve 58 has a response time of milliseconds, as described previously herein. In addition, some embodiments use a solenoid valve 66 (FIG. 4) to control the pneumatic vacuum to the valve 58. A signal from an engine controller 103 (FIG. 6) may be used to modulate the air volume to the valve 58 and thus control the position of the valve 58. This embodiment obtains improved boost pressure for faster shift responses.

Embodiments of the CVT 41 have a control ratio that provides a primary control to modulate a power of the engine over a range from a tow atmospheric intake manifold pressure to an elevated boost level above atmospheric pressure. The low atmospheric intake manifold pressure may be below atmospheric pressure. For example, in some embodiments the CVT control ratio is continuously variable over a turndown range of approximately 6:1 to 10:1, and 8:1 in some embodiments. This results in a range of pressures from about 0.15 to 1.5 atmospheres (absolute). For example, the low atmospheric intake manifold pressure may be about 0.17 atmospheres (absolute) at idle of the engine, and the elevated boost level may be about 1.4 atmospheres (absolute) at full power of the engine. At low power outputs typical of low and mid-speed operations, this solution provides a more nearly adiabatic expansion of the intake air that is fed to the cylinders compared with the near-isothermal conditions attributable to throttling.

In some embodiments, the CVT 41 may comprise a toroidal CVT, a semi-toroidal CVT, or a rolling traction CVT. Embodiments of CVT 41 also may comprise a rolling traction CVT of a Milner type, which is also known as a Milner CVT or MCVT. See, e.g., U.S. Pat. No. 7,608,006, which is incorporated herein by reference in its entirety. The CVT 41 may be single-stage and have a single set of races and planets, or more than one stage and have more than one set of races and planets coupled in series, to extend a range of the CVT control ratio. Alternatively, and as schematically depicted in FIG. 2, the CVT 41 may comprise two or more CVTs, such as different types of CVTs 41*a*, 41*b* coupled in series.

Figure 7:
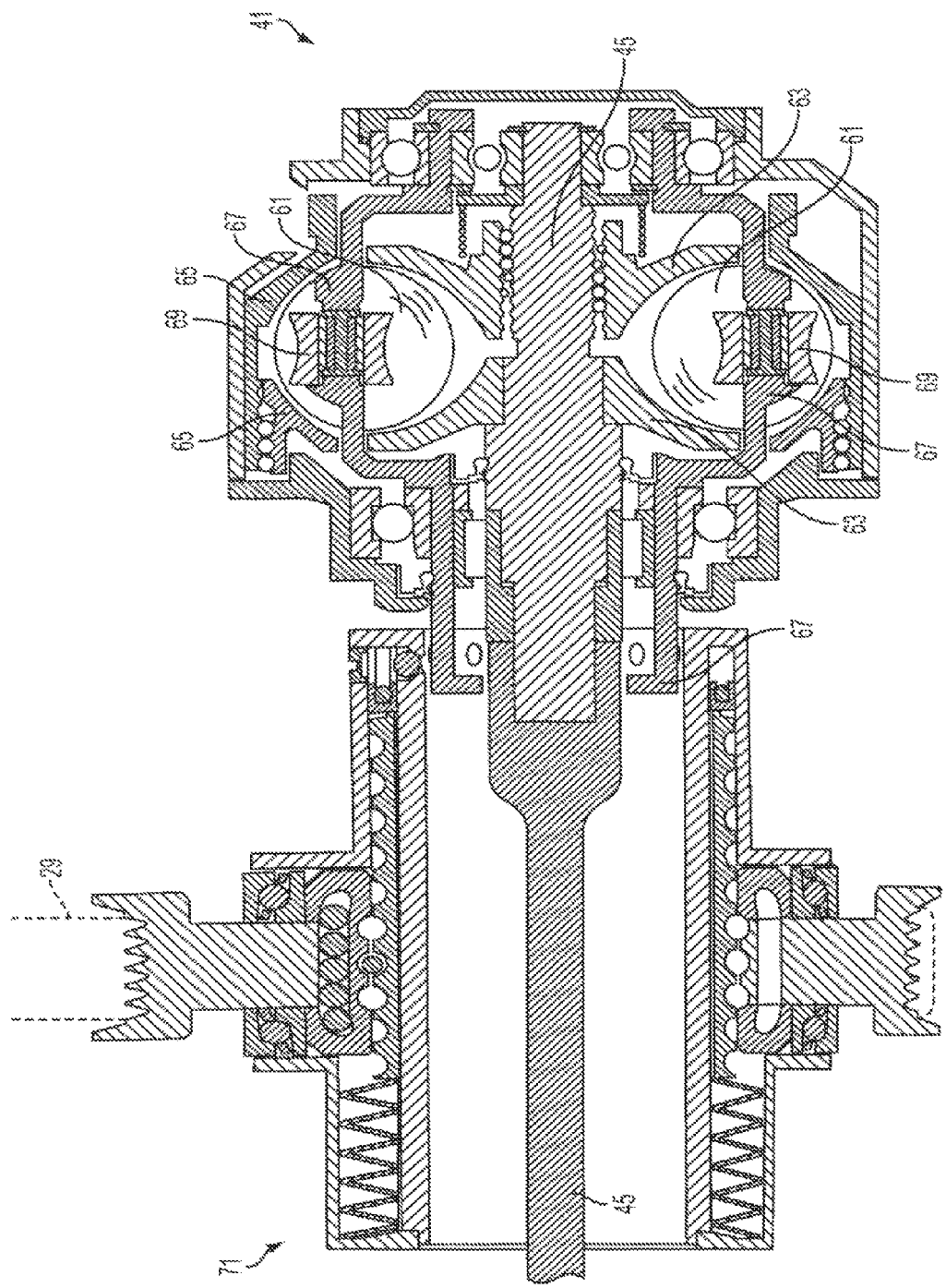
FIG. 7 is an enlarged sectional view of an embodiment of a CVT and torque pulse dampener assembly.

In the illustrated embodiment of FIG. 7, the CVT 41 comprises a variable planetary ball CVT having planetary members 61 in rotting contact with axially movable inner and outer races 63, 65 and a carrier 67 having followers 69. Embodiments of the CVT 41 may comprise metal-to-metal or ceramic traction surfaces that are adapted to be lubricated and cooled by a fluid.

Again referring to FIG. 6, a high level flow diagram of an embodiment of a control system 101 for the power plant 21 is shown. For example, control system 101 may comprise a controller 103, such as a microprocessor or engine controller (or any combination thereof) that receives input signals for manifold temperature 105, manifold pressure 107, engine speed 109, pump speed 111, input demand 113 (e.g., the gas pedal of the vehicle), and a fuel efficiency map 115. Controller 103 then outputs control signals for the engine ignition 117, fuel injection 119, engine throttle 121, pump bypass 123, CVT actuator 125 and CVT 127, or any combination thereof. As discussed herein, the CVT 127 drives the pump speed 111.

Attention is now directed to details of the TPD. Although many TPDs can be used in the foregoing powerplant embodiments, particular TPDs may be better suited for use with such powerplant embodiments.

The peak-to-mean torque pulsations caused by the firing impulses of an IC engine superimpose angular accelerations on the rotating crankshaft, and my even excite torsional resonance in the crankshaft at particular engine speeds. When the drive to the pump is taken from the front of the crankshaft where these accelerations are typically at their highest, the angular accelerations react to the inertia of the driven system as cyclic torsional pulses. Further, the system as a whole may exhibit a dynamic response greatly exacerbating the torsional loads. The size and durability of a planetary rolling traction CVT is sensitive to the peak torsional loads imposed upon it. Accordingly, and as depicted throughout the illustrated embodiments, these cyclic pulses can be reduced by a TPD 71 positioned in the driveline between the engine crankshaft and the input drive to the CVT.

There are a number of commercially available torsional damping devices to address this condition for driven engine accessories such as alternators. These devices, however, typically incorporate compliant elements that are tuned to the fixed polar moment of inertia of the driven accessory. When a ratio change mechanism is incorporated between the engine crankshaft and driven accessory, the mean torque that the compliant element reacts to changes proportionally, as does the effective polar moment of inertia of the driven system. Conventional decouplers may be limited in function across the full operating range of the CVT. This can be detrimental to the successful application of toroidal and rolling traction CVTs since the reaction of torsional pulse loads can shorten the life of the CVT and can cause failure.

To address more fully these cyclical torsional pulsation effects with a torsionally damped, torsionally compliant element, significant angular compliance of the element may be used at full torsional load. This may represent more than one revolution of differential displacement, depending on the system configuration and loading. Accordingly, one type of pulse mitigation device or TPD 71 incorporates an axially displaced piston to give torsional compliance for up to a plurality of revolutions (e.g., one two or three revolutions), if desired. This embodiment also may incorporate a variable rate spring and a damped movement.

The foregoing device that reduces or mitigates engine crankshaft cyclic pulsations is different from or additional to any torsionally compliant device (e.g., compliant coupling 47 in FIG. 1) fitted between the CVT and a pump input shaft whose purpose is to reduce or mitigate the typically lesser effects of cyclic drive torque pulsations often characteristic of supercharger input drives.

Accordingly, a connection between the CVT 41 and the crankshaft 25 may be made with at least one gear, shaft, rolling traction drive, belt or chain, or any combination thereof. Embodiments of the connection between the CVT 41 and the crankshaft 25 may comprise the TPD 71. TPD 71 may be driven by a pulley and positioned between and coupled to the crankshaft 25 and the CVT 41 to provide torsional compliance or torsional compliance and damping.

While cyclical torque pulse dynamics are relatively easy to understand and model, practical methods of mitigating torque effects in real systems have proven far less attainable. One solution that permits a plurality of complete turns of angular displacement within a compact embodiment is to change the direction of displacement of the spring and damped elements from angular to axial. Spiral splines with more than one start and viscous hydraulic damping may be employed as a simpler, inexpensive solution. Embodiments provide a sealed unit that is suitable for use as a CVT drive, an alternator dampener and still other applications.

For example, embodiments of a system, method and apparatus for a torque pulse dampener for front end accessory drives and engine accessories driven by CVTs are disclosed. One embodiment of a torque pulse dampener for an automotive alternator has a pulley diameter of about 50 mm and a maximum rotational speed of about 12,000 rpm, with a peripheral centripetal loading of about 4,000 g.

In the embodiment of FIGS. 8-13, the TPD 71 has a shaft 601 that is hollow, central and coupled to, for example, the drive shaft 603 (FIG. 8) of a mechanical device or accessory (e.g., an alternator) via an internally splined connection 605 and nut. The shaft 601 is furnished with substantial involute splines 607 on its exterior as well. In the embodiment shown, the splines 607 are truly axial, but also may comprise a shallow helix with respect to the axis. A slightly helical shape may be used to modify the drive torque spring and damping function.

A piston 609 slides freely onto the splines 607 of shaft 601 in an axial motion such that piston 609 encircles a first portion of shaft 601. The piston 609 has mating internal axial splines 611 (FIG. 11) that transmit a drive torque to the central shaft 601. This provides an output drive to the shaft 603 of the device to which it is attached. In the embodiment shown, the piston 609 has on its exterior dual start involute or spiral threads 613, such as buttress or involute form threads. The dual start threads 613 engage matching internal spiral threads 615 in the pulley housing 617.

Figure 8:
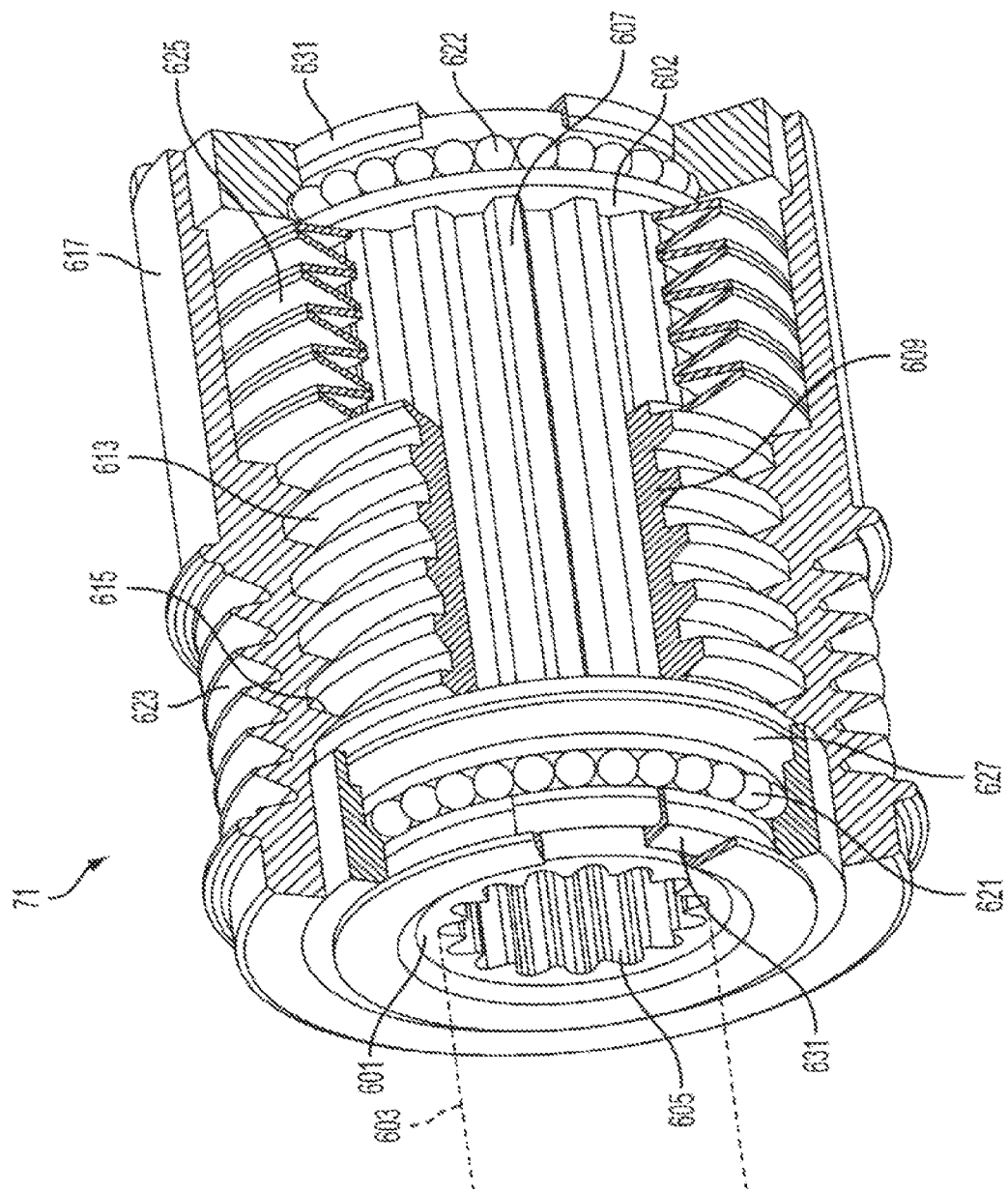
FIG. 8 is an isometric, partially-sectioned view of another embodiment of a pulse torque dampener.
Figure 9:
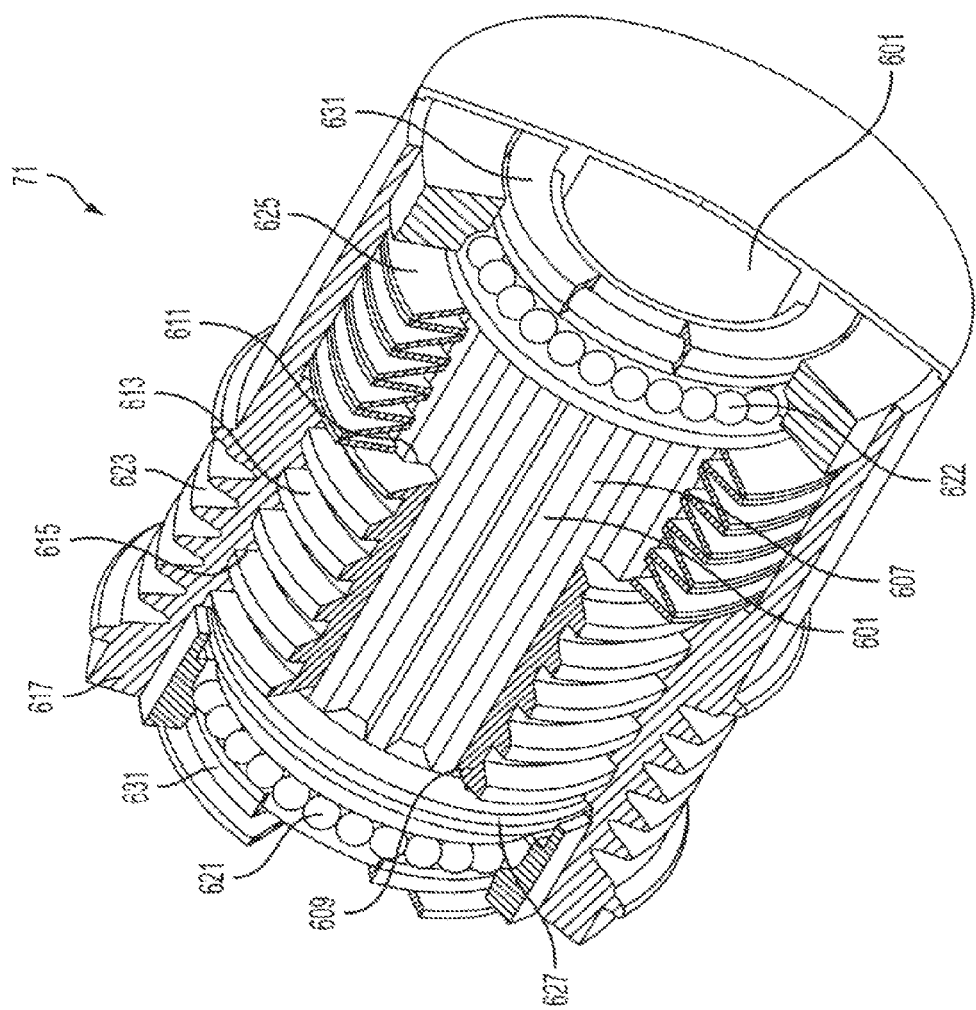
FIG. 9 is a reverse isometric, partially-sectioned view of the embodiment of the dampener of FIG. 8.
Figure 10:
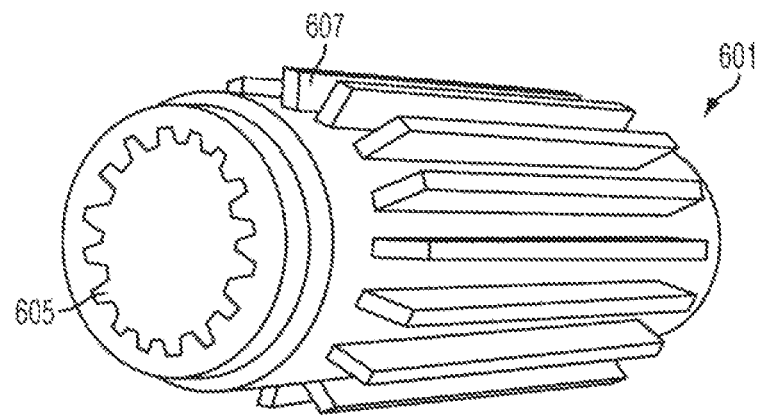
FIG. 10 is an isometric view of an embodiment of a shaft for the dampener of FIG. 8.
Figure 11:
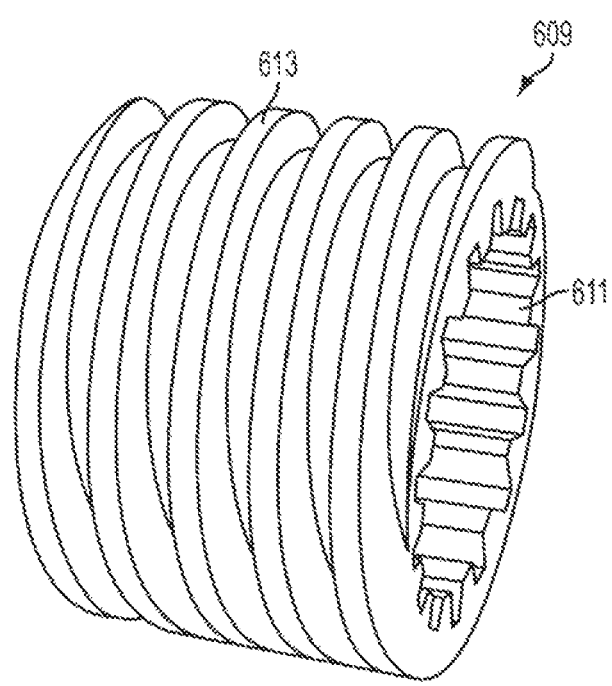
FIG. 11 is an isometric view of an embodiment of a piston for the dampener of FIG. 8.
Figure 12:
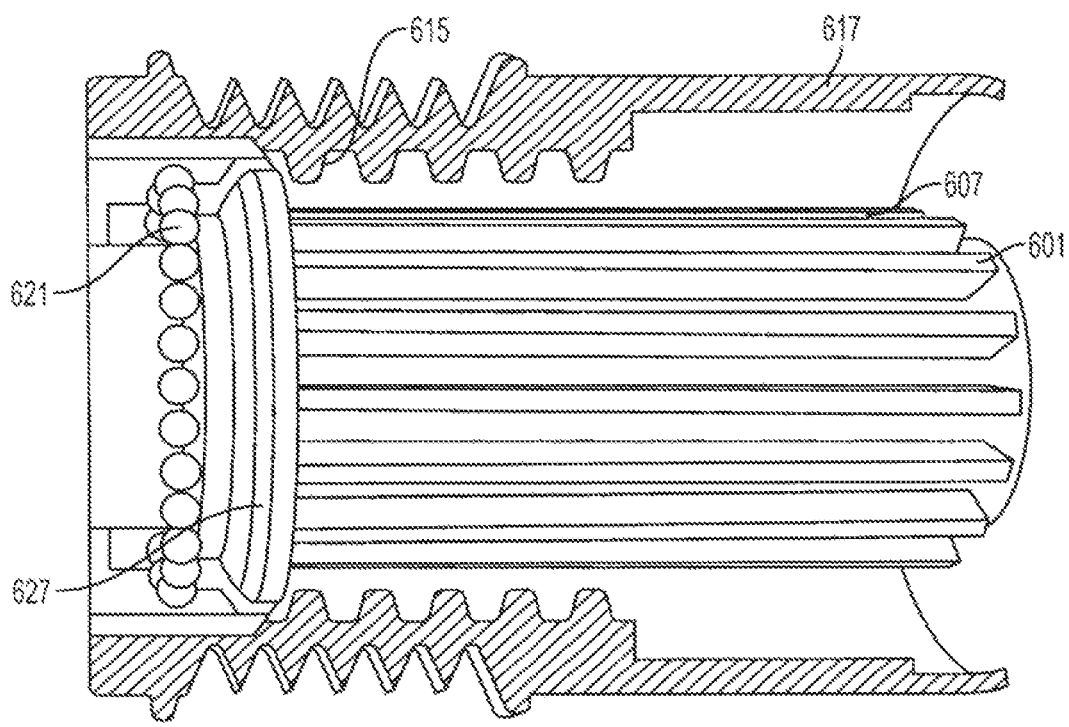
FIG. 12 is a partially-sectioned side view of portions of the embodiment of the dampener of FIG. 8.

Embodiments have a pair of full compliment, angular thrust bearings 621, 622 that are located between the housing 617 and piston 609. Thus, without the piston 609 in place, the outer pulley 623 may not drive the inner shaft 601. In the embodiment of FIG. 8, housing 617 is an extension of outer pulley 623. With the piston 609 in place, however, angular rotation of the outer pulley housing 623 about its axis relative to the inner shaft 601 causes the piston 609 to axially traverse the inner shaft 601 in either axial direction. When the outer pulley housing 623 rotates in one direction, the piston 609 moves into abutment with the bearing 621. If pulley 623 is rotated in the other direction, the piston 609 moves axially toward the open end (right side in FIG. 8) of the assembly. Under drive torque it is desirable to move the piston 609 toward the open end.

Embodiments of the second angular thrust bearing 622 are in opposition to the first bearing 621 to constrain the inner shaft 601 to the outer pulley 623. The pair of bearings 621, 622 only can move in rotation or angular displacement relative to each other. The piston 609 is constrained to move only axially if the outer pulley housing 623 is rotated relative to the inner shaft 601.

When the piston 609 moves axially toward the end (e.g., left to right in FIG. 8), the piston 609 bears on a spring 625, such as a stack of bellville springs. As shown in FIG. 8, spring 62 is arranged along a second portion of shaft 601 adjacent piston 609. The spring 625 itself is prevented from being displaced (e.g., toward the right in FIG. 8) by a flange 602 at the end of inner shaft 601. Thus, a torque applied to the outer pulley housing 623 against a counter-torque applied to the inner shaft 601 results in an axial displacement of the piston 609 against the force of the spring 625. In so doing, the outer housing 617 is angularly displaced, for a plurality of revolutions if necessary, against a predefined, increasing torsional resistance. The torsional resistance is a defined function of the configuration of the spring 625, and may be linear or non-linear in function. Further, the torsional compliance may be reconfigured for a variety of applications merely by selecting springs 625 having appropriate parameters.

In some embodiments, such as those that are used to transmit bi-directional (i.e., clockwise and counterclockwise) torque, a second compliant element, such as a spring, elastomer or Belleville washer, spring or stack, may be additionally fitted to the opposite end of piston 609 from spring element 625 along a third portion of shaft 601. Such an additional spring element is shown as spring 506 along a third portion of inner shaft 525 in FIG. 14.

In some embodiments, the damping function of the TPD 71 is achieved by partially filling the cavity between the inner shaft 601 and the housing 617 of the outer pulley 623 with a lubricant or oil of a predefined and controllable viscosity. Suitable lubricants include those that have viscosities that are substantially insensitive to temperature change.

Figure 13:
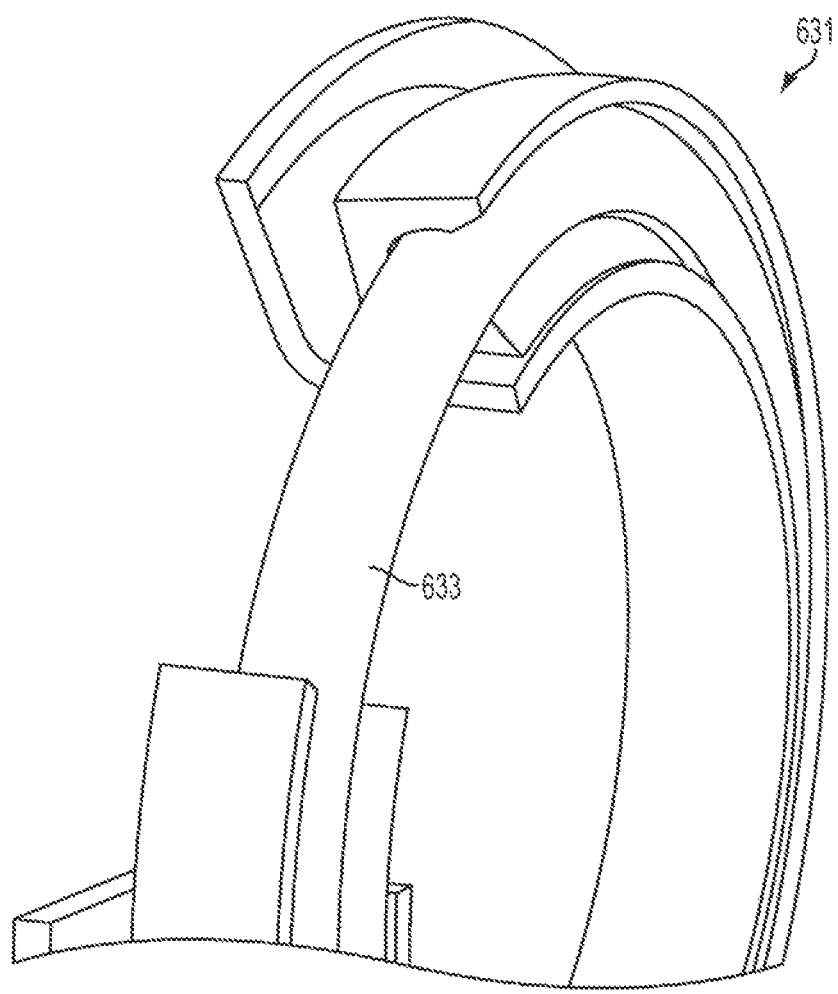
FIG. 13 is a partial-sectioned isometric view of an embodiment of a seal for the dampener of FIG. 8.

Embodiments of the lubricant and damping fluid may be permanently sealed in place by seals 631 at each end of the pulley housing and inner shaft. Oil seals 631, which are depicted in FIG. 13 as being energized by elastomer o-rings 633, have their moving contact to their outer periphery. The sealing contact pressure is intensified by the high centripetal forces, rather than being depleted by it. Typical seal materials may comprise a variety of suitable polymers or composite materials. Further, the frictional contact between the seals and their respective sealing surfaces may be used as an intrinsic part of the damping action of the device.

Again referring to FIGS. 8 and 9, some embodiments of the angular contact bearings 621, 622 may be preloaded against each other with a thrust race, such as at least one additional (e.g., stiff) Belleville spring 627 that pushes the inner races firmly against the outer races. Preloading is used because of the high angular accelerations imposed by the torsional pulsing. Preloading also reduces slippage of the balls and wear caused by its reaction against the inertia of the balls in the bearings. Accordingly, the balls are designed to roll rather than slide. Furthermore, the preload spring also facilitates assembly of the unit, which is otherwise swaged permanently together and sealed for life in some embodiments. The torque pulse dampener also may be configured such that the locations of the springs are reversed. Either way, the damping provided by the lubricant is in both axial directions as the oil is pumped.

As shown in FIGS. 7 and 14-18, embodiments of the TPD 71 may comprise, for example, an axially-displaced piston 503 encircling a first of inner shaft 525 (FIG. 14) to give torsional compliance for more than one revolution of differential displacement, and a spring 505, such as a variable-rate Belleville spring, arranged along a second portion of inner shaft 525 adjacent piston 503 to provide a damped movement. Together, the CVT 41 and TPD 71 may comprise an assembly.

A pulley 501 is rotated by belt 29 as described herein and rotates about a housing 507 via sealed thrust races 509. The pulley 501 is coupled to a recirculating ball system that axially drives the piston 503. The piston 503 acts as a ball nut for, e.g., two sets of balls 513 (FIG. 18, only one shown, for ease of understanding seated in the dual-start threads 515 on the exterior of the piston 503. The balls 513 also engage complementary threads 517 on the interior of pulley end caps 519. This embodiment provides the recirculating ball system for translating the rotational motion of the pulley 501 to axial motion of the piston 503. Alternatively, the threads 515 may comprise one start threads with one set of balls, or three-start threads with three sets of balls.

Figure 14:
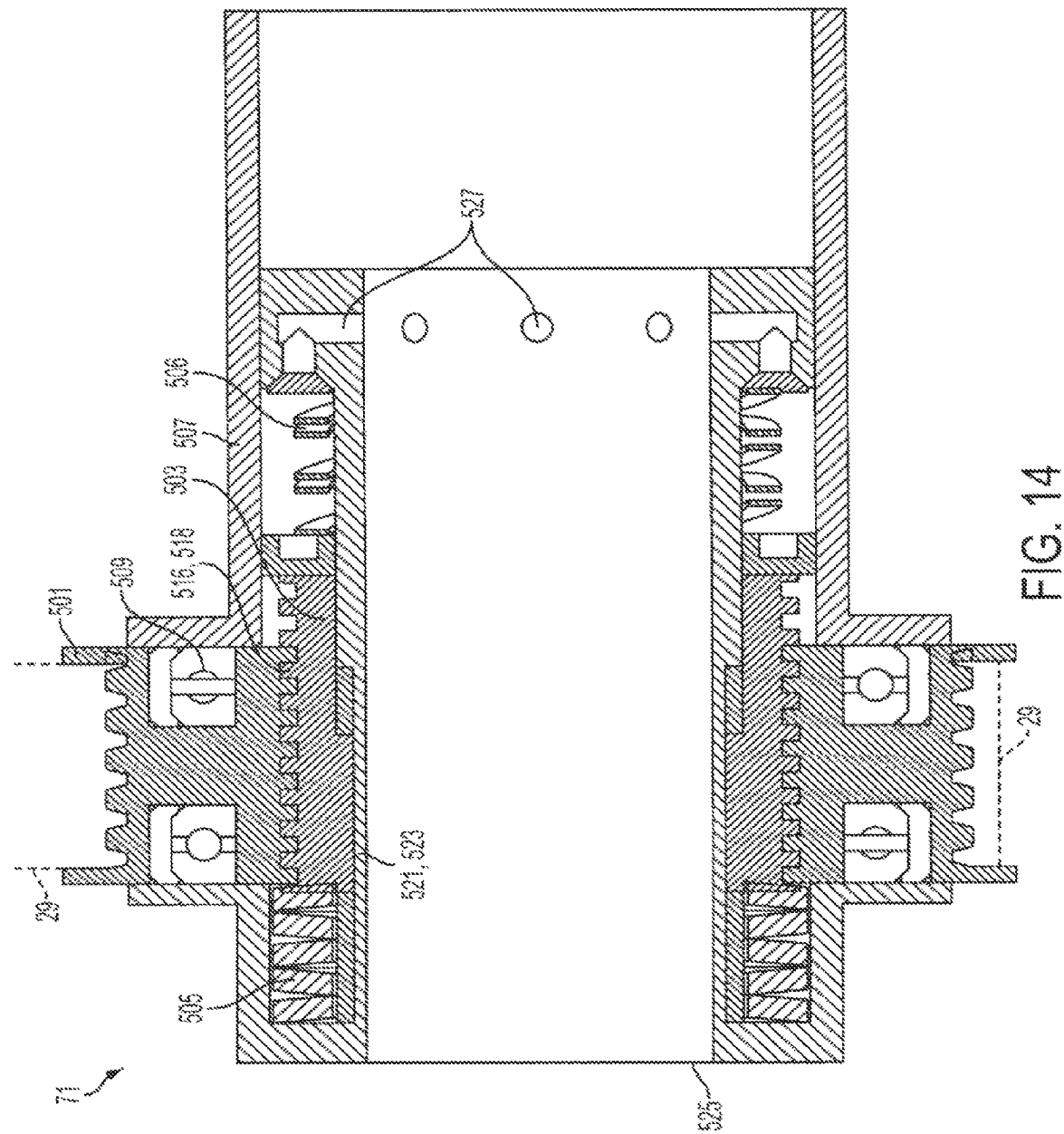
FIG. 14 is a sectional side view of another embodiment of a dampener.
Figure 15:
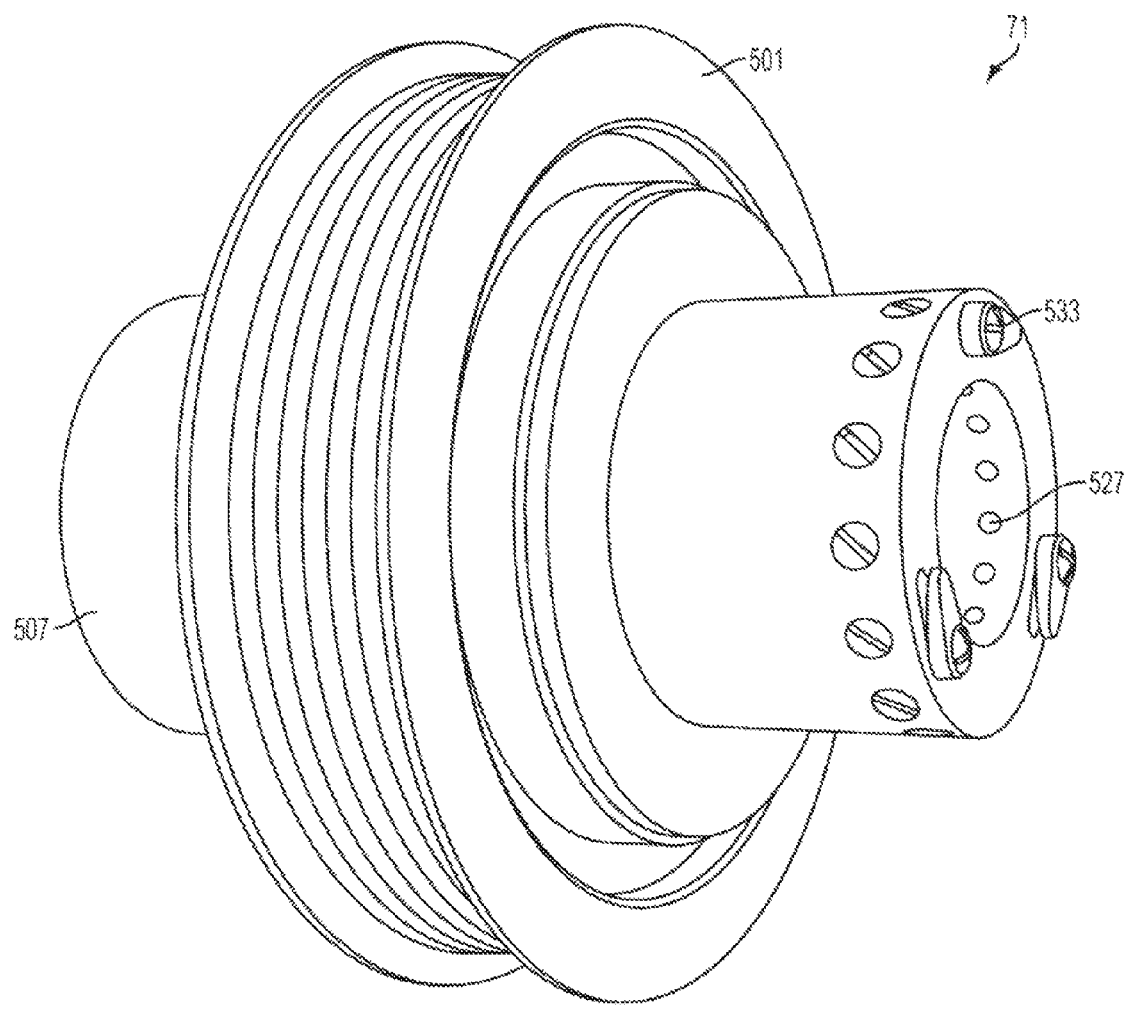
FIG. 15 is an isometric view of another embodiment of a torque pulse dampener.
Figure 16:
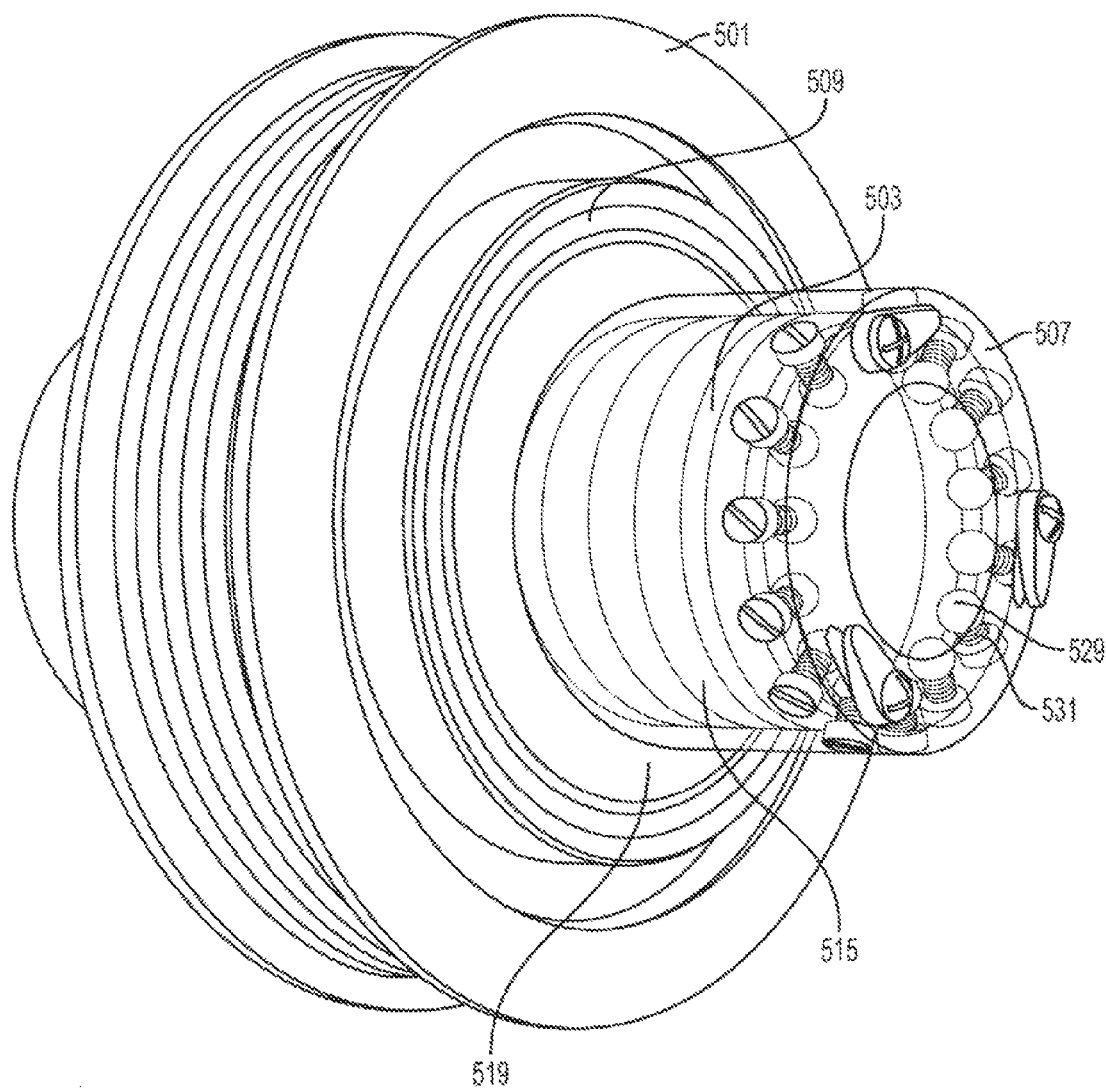
FIG. 16 is a partially-sectioned, isometric view of an embodiment of the dampener of FIG. 15.
Figure 17:
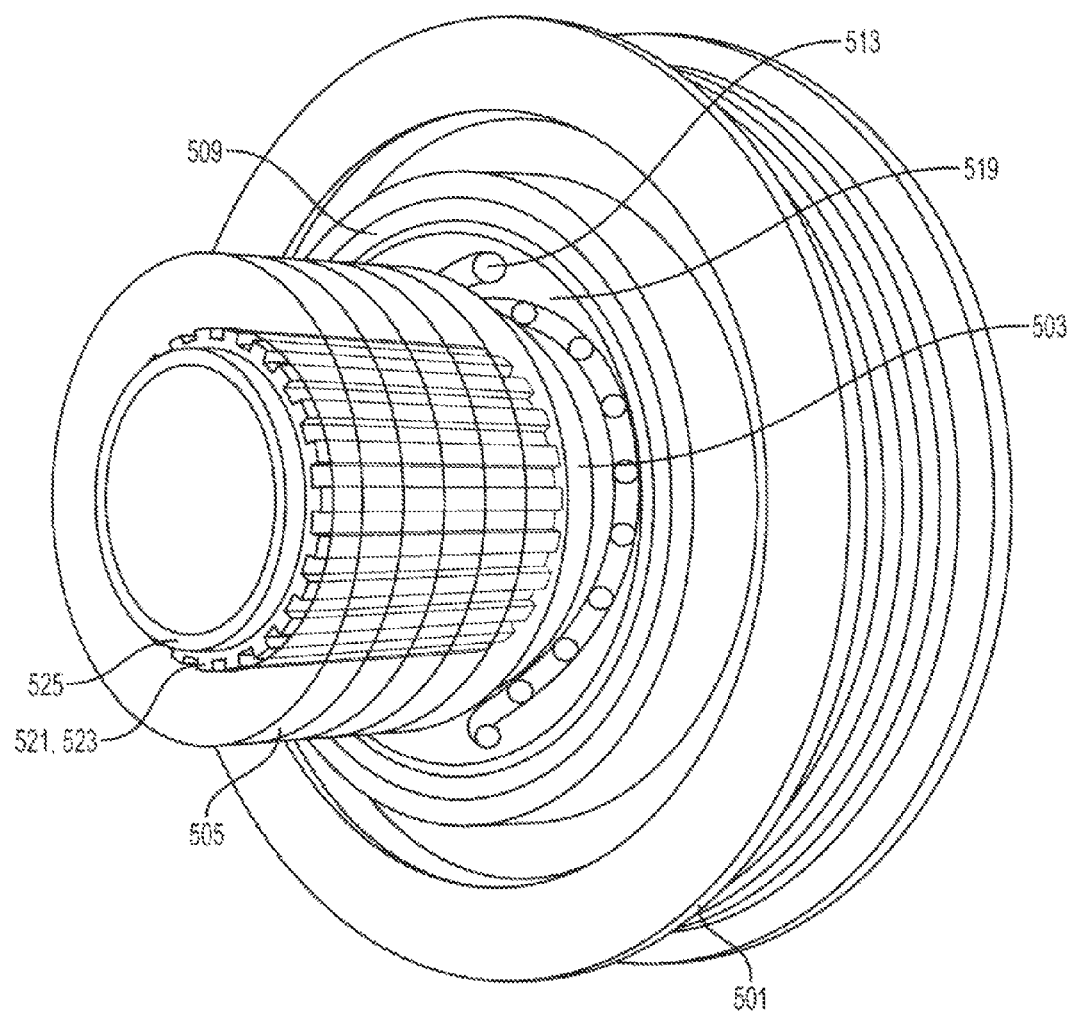
FIG. 17 is a reverse, partially-sectioned, isometric view of an embodiment of the dampener of FIG. 15.
Figure 18:
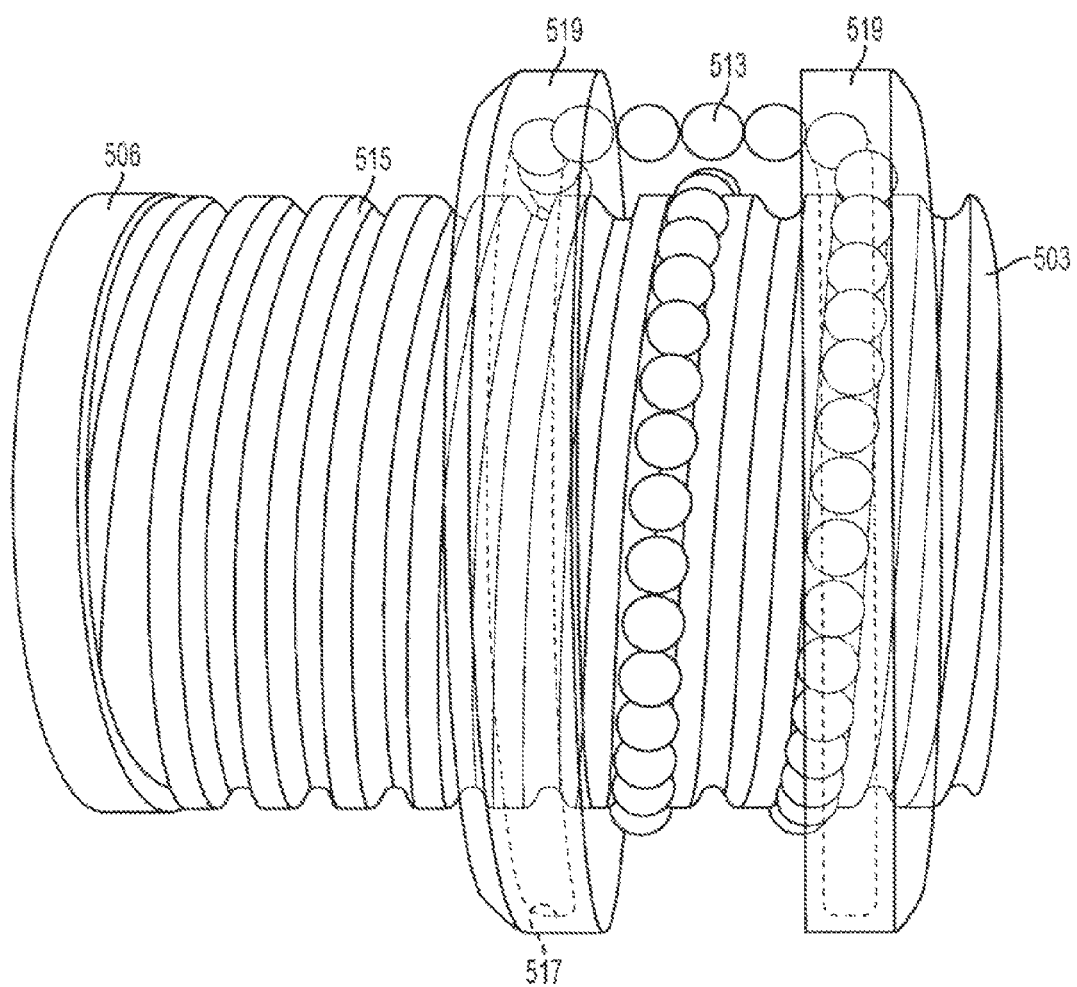
FIG. 18 is a partially-sectioned side view of embodiments of internal components of the dampener of FIG. 15.

As shown in FIG. 14, the pulley 501 and piston 503 may engage via complementary, dual-start involute or spiral threads 516, 518, such as those described herein for the embodiment of FIG. 8. Similarly, the piston 503 may comprise internal splines 521 that axially engage external splines 523 on an inner shalt 525. Thus, inner shaft 525 and piston 503 are locked in rotation together, but piston 503 is permitted to move axially with respect to inner shaft 525.

The axial motion of piston 503 draws in oil or lubricant from a reservoir, for example the CVT traction fluid lubricant, through one-way inlet valves 527 (FIG. 15), which have inlet valve balls 529 (FIG. 16) biased radially inward by springs 531. In some embodiments, oil damping is asymmetrically provided only when piston 503 moves left to right. Spring 505 provides damping when piston 503 moves right to left. In FIG. 14, however, spring 506 provides additional damping for piston 503, but also may be equipped with inlet valves 527 for oil damping. Springs 505, 506 may comprise Belleville springs or other spring elements, such as elastic elements. When TPD 71 is coupled to CVT 41 by carrier 67 (FIG. 7), fluid may be communicated via an outlet reed valve. Thus, the TPD may be damped with lubricant between a shaft, a piston and a housing of the TPD. Lubricant damping of the piston may be symmetrical in both axial directions, or asymmetrical such that it is damped in only one axial direction, and spring damping is provided in the other axial direction.

Figure 4:
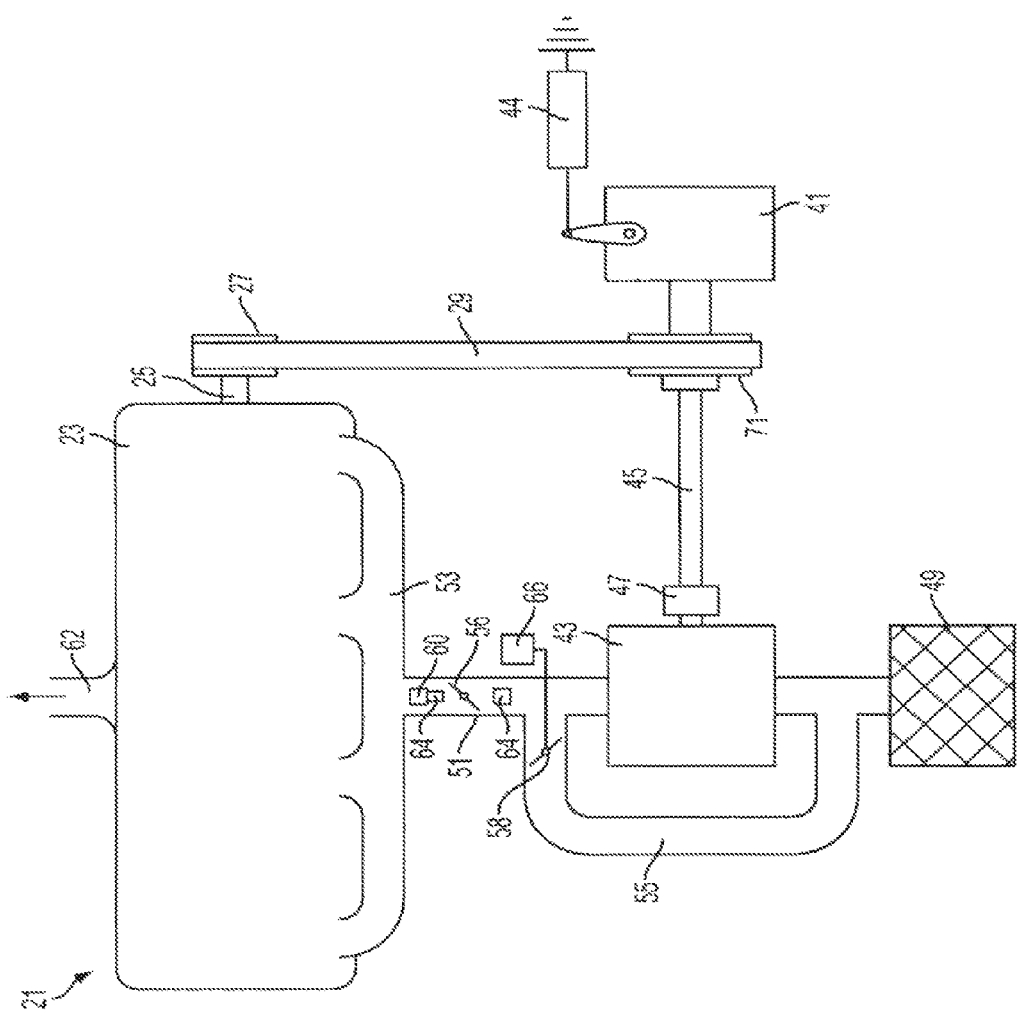
FIGS. 4 and 5 are schematic views of other embodiments of power plants.
Figure 5:
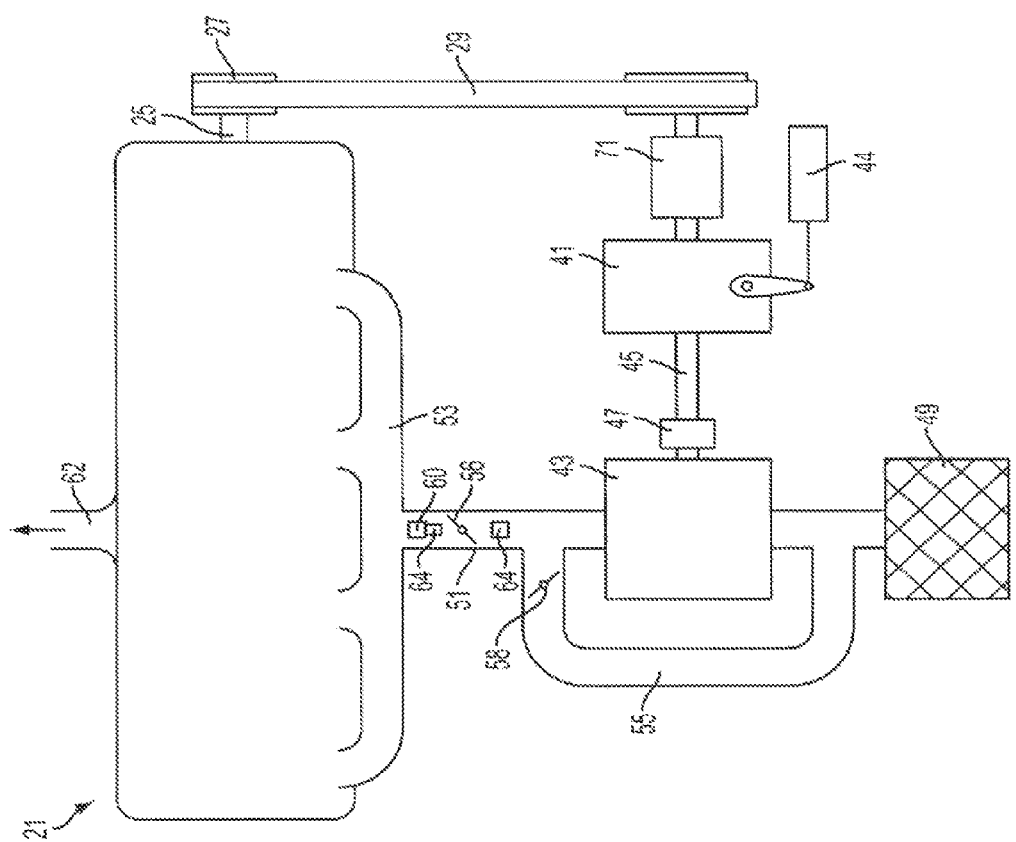

In general, TPD 71 may be coupled to a rotating element of CVT 41, such as output shaft 45, inner races 63, outer races 65, carrier 67 or followers 69 to reduce cyclic torsional pulses between CVT 41 and engine 23. It will be appreciated that the roles of inner races 63, outer races 65, and the combination of carrier 67 and followers 69 (as planets), are all interchangeable so that any one of them may be held stationary and the other two used either as the input or the output member of CVT 41. Again referring to FIGS. 4 and 5, alternate embodiments of CVT and TPD layouts are depicted. Embodiments of the torsional pulse mitigation devices depicted herein may be reconfigured for either of these designs. In FIG. 4, the TPD 71 is configured as a coaxial pulse mitigator located between the CVT 41 and pump 43, and the output shaft passes through the TPD 71 unimpeded. In such an embodiment, the output of the TPD may, in some cases, be used to drive the carrier 67 of the CVT 41 as shown in FIG. 7. The CVT 41 may be actuated by, for example, a CVT ratio change servo motor 44. In FIG. 5, an in-line pulse mitigator configuration has the CVT 41 between the TPD 71 and the pump 43, and again operated by a CVT ratio change servo motor 44.

In other embodiments, the TPD is coupled to the crankshaft and the CVT for dampening torque pulses between the IC engine and the CVT. The TPD may comprise a pulley coupled to the crankshaft via a belt and adapted for rotation therewith, wherein the pulley rotationally engages and axially displaces a piston within the TPD to give torsional compliance from the IC engine for at least one-half revolution of angular differential displacement between the pulley and the piston. The pulley rotationally engages the piston with a ball screw or buttress threads. The TPD may comprise a variable-rate Belleville spring and a damped movement for the piston. The TPD is located between the pump and the CVT such that the CVT has an output that extends through the TPD to the pump, or the CVT is located between the pump and the TPD. An output of the TPD drives a carrier of the CVT, and the CVT is actuated by a CVT ratio change servo motor.

The TPD may have a shaft coupled to a drive shaft of the pump via an internally splined connection, the shaft also having splines that are external and involute. The piston is axially movable on the shaft splines, the piston also having threads on an exterior thereof comprising dual-start involute or spiral threads, a pulley threadingly mounted to the threads of the piston, and the pulley is coupled to the crankshaft. Angular rotation of the pulley about an axis relative to the shaft causes the piston to axially traverse the shaft in either axial direction. A first angular thrust bearing between a housing of the pulley and the piston physically constrains the shaft to the pulley. A second angular thrust bearing is in opposition to the first angular thrust bearing, wherein the first and second angular thrust bearings are limited to rotational or angular displacement relative to each other, such that the piston is physically constrained to move only substantially axially when the pulley is rotated relative to the shaft. The first and second angular thrust bearings may be preloaded against each other with a thrust race.

A spring may be located between the housing and the piston for axially restraining the piston, wherein a torque applied to the pulley against a counter-torque applied to the shaft axially displaces the piston against the three of the spring, such that the housing is angularly displaced against an increasing torsional resistance defined by the spring. Angular displacement of the housing may comprise at least one-half or one revolution relative to the piston. The pulley may be coupled to a recirculating ball system that axially drives the piston, the piston acts as a ball nut for at least one set of balls seated in threads on an exterior of the piston, and the balls engage complementary threads on an interior of the pulley for translating the rotational motion of the pulley to axial motion of the piston.

The TPD embodiments disclosed herein have numerous advantages. If drive torque is needed, it provides significant angular displacement of about 1.5 turns or more. This exceeds the displacement of conventional devices, which are limited to no more than about one-quarter turn. Moreover, these TPD embodiments convert rotation to linear displacement to achieve greater angular displacement with a ball screw or thread screw. The ramps on the housing and piston are used for axial displacement.

Figure 19:
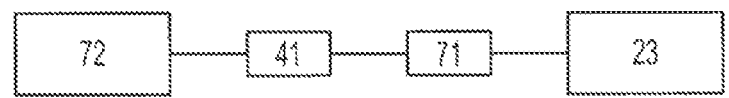
FIG. 19 is a schematic diagram of another embodiment of a powertrain system.

In one embodiment, the TPD is well suited for dampening applications having large torque pulses, such as engines with low cylinder counts (e.g., one-cylinder all terrain vehicle (ATV) engines). For example, FIG. 19 schematically depicts an embodiment of a powertrain or drivetrain system including a transmission 72 for the drivetrain that changes gears to distribute power to a wheel of a vehicle having the power plant. The transmission 72 may have a plurality of fixed ratios. The CVT 41 and TPD 71 may be coupled between the engine 23 and transmission 72 to mitigate torque pulses from the engine 23 to the transmission 72.

Figure 20:
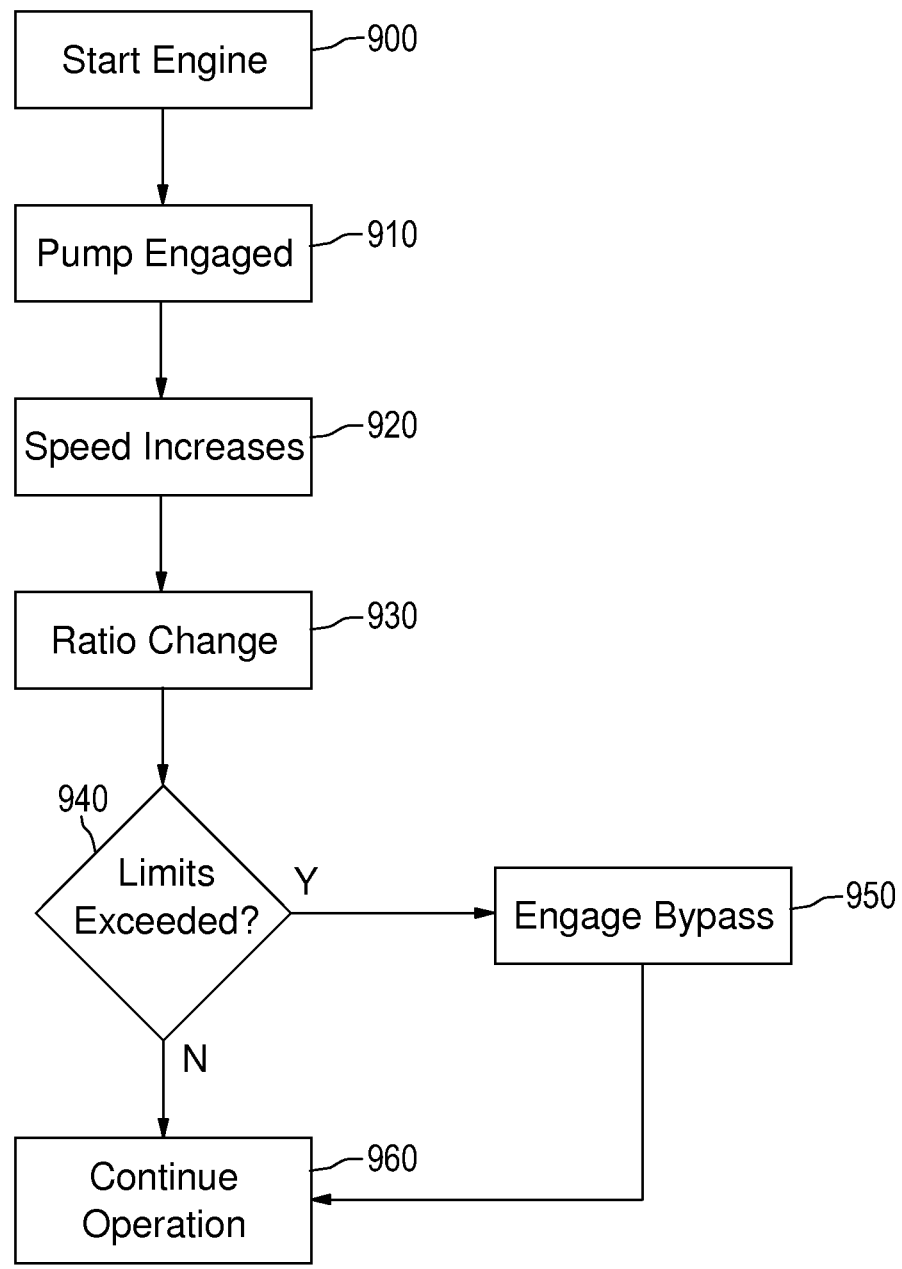
FIG. 20 is a flowchart showing the operation of a bypass valve in accordance with the FIGS. above.

FIG. 20 is a flowchart showing the operation of a bypass valve in accordance with the FIGS. above. In a first step 900, the engine is started and air begins to flow through the engine intake manifold. In a second step 910, the supercharger or turbocharger pump is engaged and sends higher pressure air to the engine intake manifold. In a third step 920, the engine speed increases whereby the pump increases the pressure of the air to the engine intake manifold, generally in response to an operator demanding greater speed by depressing a throttle. In a fourth step 930, this increased demand may create a ratio change in the CVT as the system responds to these demands.

In a fifth step 940, control software determines whether the air pressure or temperature exceed certain limits acceptable during a ratio change. If yes, then in step 950, a bypass valve is temporarily opened to decrease the pressure and or temperature within the engine intake manifold. The bypass valve may be a fully opened, partially opened, or fully opened intermittently such as with pulse modulation. Once the ratio change has completed or if the pressure and temperature within the engine intake manifold have fallen within specification, then the bypass valve is closed and processing continues to step 960. If not in step 940, then in step 960 the engine proceeds operating until the driver demands another speed increase or a speed decrease or turns off the engine.

The following is an example of modeling an embodiment of an internal combustion engine furnished with a positive displacement supercharger driven from the engine's crankshaft via a CVT as described above. The input variables are RPM engine=700, CVT ratio=7, CVT efficiency=0.87, SC torque=30 Nm, and SC pmi=$7.44*10^{-4}$ Kg m2. With an engine firing frequency at 2 pulses per revolution such as with a four cylinder four stroke engine, Hz pulses=(RPM engine*2)/60=23.3. With a design frequency sufficiently below pulse frequency to avoid excitement Hz design=Hz pulse/2=11.7. The design period of oscillation is T design=1/Hz design=0.0857 sec. From the fundamental torsional pendulum relationship T=(2*pi*(square root of (I/K)) where T=period of oscillation, I=polar moment of inertia, and K=torsional constant. When rearranged in terms of the torsional constant K, K=4*pi squared*I/(T squared). Substituting the input variables to give K at the CVT carrier input K coupling=4*(pi squared)*SC pmi*CVT ratio/(T design squared)=27.98. From the fundamental relationship T=−K*theta where T=driving torque and theta=angular displacement, rearranged in terms of theta becomes theta=−(T/K). Substituting the input variables, the angular displacement theta and the drive torque in radians, theta=−8.63 rad or −494.195 degrees or approximately 1.4 rotations due to the mean torque.

The methods and systems described herein overcome other attempts to improve fuel efficiency, power, or other operational concerns. For a given defined driving cycle, the fuel consumption of an automobile is significantly dependent on vehicle mass, aerodynamic drag and rolling resistance drag. Advances in overall vehicle design to improve fuel efficiency have therefore commonly involved the reduction of weight, frontal area and aerodynamic coefficient of drag, as well as the optimization of the drive train. However, such improvements may not significantly affect the performance of the power plant, for example an IC engine.

Selective cylinder deactivation is being considered by some automobile companies. However, this alternative tends to be limited to engines with the larger number of cylinders, and have so far failed to impact the smaller, four cylinder engine market directed toward fuel efficiency.

While some techniques reduce throttling losses, they have by no means eliminated them. A typical modern engine still spends a very large portion of its time running throttled. For example, during low to mid-speed operation, or coasting and idling in traffic, both of which comprise a significant portion of contemporary driving, the engine is still running at least partially throttled.

Japanese Patent 1-110874, attempts to conceptually show how some energy may be reclaimed by using a hydraulically-controlled, belt-driven CVT. The execution of this design by means of a belt-driven CVT, with its low efficiency, limited durability, and slow ratio-change response time render it impractical. U.S. Pub. No, 2006/0032225 and WO 2010/017324 disclose other conventional CVT solutions.

Thus, the methods and systems as described herein provide a more universal solution to designing highly fuel efficient vehicles, rather than providing multiple tradeoffs between conventional approaches, such as aerodynamics, selective cylinder deactivation, or less sophisticated approaches. The embodiments as described herein provide a synergistic approach to design that seeks to combine complimentary technologies to bring a significant cumulative effect to address more fully the problem. In the field of fuel efficient automobile design and innovation there are now some examples of this. While the embodiments described herein provide a better solution as compared to conventional approaches, the embodiments can be implemented with any one or more of the conventional approaches, such as improved aerodynamics, selective cylinder deactivation, or the like. For example, TPD embodiments may allow superchargers or front end accessories to be used more effectively with a four cylinder engine, with or without selective cylinder deactivation.

Note that not all of the activities described above in the general description or the examples are required, that a portion of a specific activity may not be required, and that one or more further activities may be performed in addition to those described. Still further, the order in which activities are listed are not necessarily the order in which they are performed.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Many other embodiments may be apparent to those of skill in the art upon reviewing the disclosure. Other embodiments may be used and derived from the disclosure, such that a structural substitution, logical substitution, or another change may be made without departing from the scope of the disclosure. Accordingly, the disclosure is to be regarded as illustrative rather than restrictive.

Certain features are, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A torsional pulse dampener comprising:
   a hollow shaft comprising a first set of splines extending longitudinally along an exterior surface of the hollow shaft;
   a piston encircling a first portion of the hollow shaft, wherein the piston comprises a second set of splines extending longitudinally along an interior surface of the piston, and wherein the second set of splines is slidingly mated with the first set of splines;
   a first spring arranged along a second portion of the hollow shaft adjacent the piston to provide axial restraint of the piston;
   a pulley encircling at least a portion of the piston, wherein the pulley is threadingly mounted to the piston via respective screw threads comprising an interior surface of the pulley and an exterior surface of the piston such that the piston is axially displaced relative to the pulley by rotation of the pulley; and
   one or more rotary bearings disposed within the torsional pulse dampener such that the piston is axially displaced along the hollow shaft by rotation of the pulley.

2. The torsional pulse dampener of claim 1, wherein the first spring is a variable-rate spring.

3. The torsional pulse dampener of claim 1, wherein the hollow shaft comprises a third set of splines extending longitudinally along an interior surface of the hollow shaft.

4. The torsional pulse dampener of claim 1, wherein the screw thread comprising the exterior surface of the piston is a dual-start thread.

5. The torsional pulse dampener of claim 1, wherein the one or more rotary bearings comprise a pair of angular thrust bearings respectively disposed between the hollow shaft and the pulley at opposite ends of the hollow shaft, wherein the pair of thrust bearings are angularly displaceable relative to each other such that the hollow shaft is constrained relative to the pulley and the piston is constrained to axial motion when the pulley is rotated relative to the hollow shaft.

6. The torsional pulse dampener of claim 5, further comprising a second spring disposed between one of the pair of angular thrust bearings and an end of the piston opposing the first spring to preload the pair of thrust bearings against each other.

7. The torsional pulse dampener of claim 1, wherein the first spring comprises a spring rate sufficient to allow at least one-half revolution of an angular differential displacement between the pulley and the piston while a torque is applied to the pulley and a counter-torque is applied to the hollow shaft.

8. The torsional pulse dampener of claim 7, wherein the spring rate is sufficient to allow at least one revolution of angular differential displacement between the pulley and the piston while a torque is applied to the pulley and a counter-torque is applied to the hollow shaft.

9. The torsional pulse dampener of claim 1, further comprising a housing adjacent the pulley, wherein one of the one or more rotary bearings is disposed between the pulley and the housing such that the pulley is rotational relative to the housing.

10. The torsional pulse dampener of claim 9, further comprising one-way inlet valves disposed at one end of the hollow shaft along its interior surface.

11. The torsional pulse dampener of claim 1, wherein one of the one or more rotary bearings is disposed between the hollow shaft and the pulley at one end of the hollow shaft, and wherein the torsional pulse damper further comprises an oil seal at the end of the hollow shaft exterior to the one rotary bearing.

12. The torsional pulse dampener of claim 1, further comprising a second spring arranged along a third portion of the hollow shaft adjacent an opposite end of the piston to which the first spring is arranged.

13. A power plant comprising:
   an engine;
   a first pulley coupled to a crankshaft of the engine;
   a pump coupled to an engine intake manifold of the engine;
   a drive shaft coupled to the pump;
   a continuous variable transmission coupled to the drive shaft;
   a torque pulse dampener arranged exterior to the continuous variable transmission and coupled to a rotating element of the continuous variable transmission, wherein the torque pulse dampener comprises:
      a second pulley;
      a piston that is axially displaceable within the second pulley by rotational movement of the second pulley, wherein the second pulley is moveably engaged with threads extending along an exterior surface of the piston to a full extent of axial displacement of the piston;
      a hollow shaft coupled to the piston via matted splines extending longitudinally along an exterior surface of the hollow shaft and along an interior surface of the piston; and
      a spring arranged along a portion of the hollow shaft adjacent the piston to provide axial restraint of the piston, wherein the spring comprises a spring rate sufficient to allow torsional compliance from the engine for at least one-half revolution of an angular differential displacement between the second pulley and the piston while a torque is applied to the second pulley and a counter-torque is applied to the hollow shaft; and
   a belt looped over the first and second pulleys.

14. The power plant of claim 13, wherein the second pulley is rotationally coupled to the piston with a ball screw or buttress threads.

15. The power plant of claim 13, wherein the torque pulse dampener is coupled to an output shaft of the continuous variable transmission, wherein the hollow shaft is coupled to the output shaft via a splined connection.

16. The power plant of claim 13, wherein the continuous variable transmission is a planetary ball continuous variable transmission.

17. The power plant of claim 13, wherein the drive shaft passes through the hollow shaft of the torque pulse dampener.

18. The power plant of claim 13, wherein the torque pulse dampener further comprises one or more rotary bearings disposed within the torsional pulse dampener such that the piston is axially displaced along the hollow shaft by rotation of the second pulley.

19. The power plant of claim 13, wherein the engine is a one-cylinder engine.

20. The power plant of claim 13, further comprising an additional transmission coupled to the engine or to the continuous variable transmission.

21. The power plant of claim 13, wherein an output shaft of the continuous variable transmission passes through the hollow shaft of the torque pulse dampener.

22. The power plant of claim 13, wherein the spring rate is sufficient to give torsional compliance from the engine for at least one revolution of an angular differential displacement between the second pulley and the piston while a torque is applied to the second pulley and a counter-torque is applied to the hollow shaft.

23. The power plant of claim 13, wherein the spring rate is sufficient to give torsional compliance from the engine for at least two revolutions of an angular differential displacement between the second pulley and the piston while a torque is applied to the second pulley and a counter-torque is applied to the hollow shaft.

24. The power plant of claim 13, wherein the spring rate is sufficient to give torsional compliance from the engine for at least three revolutions of an angular differential displacement between the second pulley and the piston while a torque is applied to the second pulley and a counter-torque is applied to the hollow shaft.

25. The power plant of claim 13, wherein the hollow shaft of the torque pulse dampener is coupled to an input shaft of the continuous variable transmission via matted splines extending longitudinally along an exterior surface of the input shaft and along an interior surface of the hollow shaft.

26. A device, comprising:
   a continuous variable transmission; and
   a torque pulse dampener arranged exterior to the continuous variable transmission and coupled to a rotating element of the continuous variable transmission, wherein the torque pulse dampener comprises:
      a hollow shaft unimpededly encircling an output shaft of the continuous various transmission;
      a piston encircling a first portion of the hollow shaft, wherein the piston comprises a second set of splines extending longitudinally along an interior surface of the piston, wherein the second set of splines is mated with a first set of splines of the hollow shaft;
      a first spring arranged along a second portion of the hollow shaft adjacent the piston;
      a pulley encircling and coupled to the piston such that the piston is axially displaced along relative to the pulley by rotation of the pulley; and
      one or more rotary bearings disposed within the torsional pulse dampener such that the piston is axially displaced along the hollow shaft by rotation of the pulley.

27. The torsional pulse dampener of claim 26, wherein the one or more rotary bearings comprise a pair of angular thrust bearings respectively disposed between the hollow shaft and the pulley at opposite ends of the hollow shaft, wherein the pair of thrust bearings are angularly displaceable relative to each other such that the hollow shaft is constrained relative to the pulley and the piston is constrained to axial motion when the pulley is rotated relative to the hollow shaft.

28. The torsional pulse dampener of claim 26, wherein the first spring comprises a spring rate sufficient to allow at least one-half revolution of an angular differential displacement between the pulley and the piston while a torque is applied to the pulley and a counter-torque is applied to the hollow shaft.

29. The torsional pulse dampener of claim 26, further comprising a second spring arranged along a third portion of the hollow shaft adjacent an opposite end of the piston to which the first spring is arranged.

30. A torsional pulse dampener comprising:
   a hollow shaft comprising a first set of splines extending longitudinally along an exterior surface of the hollow shaft;
   a piston encircling a first portion of the hollow shaft, wherein the piston comprises a second set of splines extending longitudinally along an interior surface of the piston, and wherein the second set of splines is slidingly mated with the first set of splines;
   a first spring arranged along a second portion of the hollow shaft adjacent the piston to provide axial restraint of the piston;
   a pulley encircling at least a portion of the piston, wherein the pulley comprises a recirculating ball system to axially displace the piston relative to the pulley by rotation of the pulley, and wherein the piston acts as a ball nut for the recirculating ball system; and
   one or more rotary bearings disposed within the torsional pulse dampener such that the piston is axially displaced along the hollow shaft by rotation of the pulley.

31. The torsional pulse dampener of claim 30, wherein the one or more rotary bearings comprise a pair of angular thrust bearings respectively disposed between the hollow shaft and the pulley at opposite ends of the hollow shaft, wherein the pair of thrust bearings are angularly displaceable relative to each other such that the hollow shaft is constrained relative to the pulley and the piston is constrained to axial motion when the pulley is rotated relative to the hollow shaft.

32. The torsional pulse dampener of claim 30, wherein the first spring comprises a spring rate sufficient to allow at least one-half revolution of an angular differential displacement between the pulley and the piston while a torque is applied to the pulley and a counter-torque is applied to the hollow shaft.

33. The torsional pulse dampener of claim 30, further comprising a second spring arranged along a third portion of the hollow shaft adjacent an opposite end of the piston to which the first spring is arranged.

* * * * *